(12) United States Patent
Snider

(10) Patent No.: US 8,827,347 B2
(45) Date of Patent: Sep. 9, 2014

(54) VEHICLE WINDOW WITH SHADE

(75) Inventor: Darin J. Snider, Holland, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

(21) Appl. No.: 13/642,908

(22) PCT Filed: Apr. 22, 2011

(86) PCT No.: PCT/US2011/033515
§ 371 (c)(1),
(2), (4) Date: Oct. 23, 2012

(87) PCT Pub. No.: WO2011/133830

PCT Pub. Date: Oct. 27, 2011

(65) Prior Publication Data

US 2013/0038093 A1    Feb. 14, 2013

Related U.S. Application Data

(60) Provisional application No. 61/447,994, filed on Mar. 1, 2011, provisional application No. 61/327,181, filed on Apr. 23, 2010.

(51) Int. Cl.
*B60J 3/06* (2006.01)
*B60J 7/00* (2006.01)
*B62D 25/06* (2006.01)

(52) U.S. Cl.
CPC .............. *B60J 7/0015* (2013.01); *B62D 25/06* (2013.01)
USPC ...................... 296/97.8; 160/370.22; 296/215

(58) Field of Classification Search
CPC ...... B60J 7/0015; B60J 3/0286; B60J 1/2063; B62D 25/06
USPC .................. 296/214, 215, 210, 97.8, 216.08, 296/216.01, 216.04, 216.06, 96.14, 97.4; 160/98, 370.22
See application file for complete search history.

(56) References Cited

U.S. PATENT DOCUMENTS 1,703,395 A * 2/1929 House ........................... 296/214
3,989,357 A   11/1976 Kalt (Continued)

FOREIGN PATENT DOCUMENTS

WO   WO 2012/037190    3/2012
WO   WO 2012/177995    12/2012

OTHER PUBLICATIONS

International Search Report from corresponding PCT application No. PCT/US2011/033515, dated Jul. 7, 2011.

(Continued)

*Primary Examiner* — Jason S Morrow
*Assistant Examiner* — E Turner Hicks
(74) *Attorney, Agent, or Firm* — Gardner, Linn, Burkhart & Flory, LLP

(57) ABSTRACT

A window assembly for a vehicle includes outer and inner window panels and a spacer element disposed therebetween to establish an interpane cavity between the inner and outer window panels. At least one of (a) the outer window panel has a larger cross dimension relative to the inner window panel to provide overhang regions, and (b) the inner window panel has a different contour or curvature than that of the outer window panel so that the interpane cavity varies in gap distance across the window assembly. A roller shade is disposed in the cavity and is electrically deployable to coil and uncoil between a coiled light transmitting condition, where the roller shade functions to substantially allow light transmission through the window assembly, and an at least partially uncoiled light attenuating condition, where the roller shade functions to at least partially attenuate light transmission through the window assembly.

30 Claims, 11 Drawing Sheets

(56) References Cited

U.S. PATENT DOCUMENTS

| | | |
|---|---|---|
| 4,105,294 A | 8/1978 | Peck |
| 4,248,501 A | 2/1981 | Simpson |
| 4,266,339 A | 5/1981 | Kalt |
| 4,336,536 A | 6/1982 | Kalt et al. |
| 4,364,214 A | 12/1982 | Morgan et al. |
| 4,364,595 A | 12/1982 | Morgan et al. |
| 4,383,255 A | 5/1983 | Grandjean et al. |
| 4,468,663 A | 8/1984 | Kalt |
| 4,597,636 A | 7/1986 | Hoshikawa |
| 4,707,570 A | 11/1987 | Ide et al. |
| 4,747,670 A | 5/1988 | Devio et al. |
| 4,788,089 A | 11/1988 | Skipper |
| 4,799,768 A | 1/1989 | Gahan |
| 4,891,635 A | 1/1990 | Hata |
| 4,915,486 A | 4/1990 | Hansen |
| 4,931,782 A | 6/1990 | Jackson |
| 4,978,952 A | 12/1990 | Irwin |
| 5,066,112 A | 11/1991 | Lynam et al. |
| 5,151,816 A | 9/1992 | Varaprasad et al. |
| 5,231,559 A | 7/1993 | Kalt et al. |
| 5,233,459 A | 8/1993 | Bozler et al. |
| 5,233,461 A | 8/1993 | Dornan et al. |
| 5,239,405 A | 8/1993 | Varaprasad et al. |
| 5,239,406 A | 8/1993 | Lynam |
| 5,406,305 A | 4/1995 | Shimomura et al. |
| 5,472,643 A | 12/1995 | Varaprasad et al. |
| 5,519,565 A | 5/1996 | Kalt et al. |
| 5,605,370 A | 2/1997 | Ruiz |
| 5,638,084 A | 6/1997 | Kalt |
| 5,668,663 A | 9/1997 | Varaprasad et al. |
| 5,724,187 A | 3/1998 | Varaprasad et al. |
| 5,828,432 A | 10/1998 | Shashidhar et al. |
| 5,853,895 A | 12/1998 | Lewno |
| 5,917,431 A | 6/1999 | Sanada et al. |
| 5,919,397 A | 7/1999 | Ichihashi et al. |
| 6,039,390 A * | 3/2000 | Agrawal et al. ............... 296/211 |
| 6,057,814 A | 5/2000 | Kalt |
| 6,086,133 A | 7/2000 | Alonso |
| 6,107,941 A | 8/2000 | Jones |
| 6,144,359 A | 11/2000 | Grave |
| 6,220,650 B1 | 4/2001 | Davis et al. |
| 6,288,824 B1 | 9/2001 | Kastalsky |
| 6,299,235 B1 | 10/2001 | Davis et al. |
| 6,299,255 B1 | 10/2001 | Pichon |
| 6,317,108 B1 | 11/2001 | Kalt |
| 6,394,529 B2 | 5/2002 | Davis et al. |
| 6,420,036 B1 | 7/2002 | Varaprasad et al. |
| 6,493,128 B1 | 12/2002 | Agrawal et al. |
| 6,513,864 B2 | 2/2003 | Böhm et al. |
| 6,520,239 B2 | 2/2003 | Schlecht et al. |
| 6,528,782 B1 | 3/2003 | Zhang et al. |
| 6,572,176 B2 | 6/2003 | Davis et al. |
| 6,606,185 B2 | 8/2003 | Saxe |
| 6,669,267 B1 | 12/2003 | Lynam et al. |
| 6,692,646 B2 | 2/2004 | Kalt et al. |
| 6,729,674 B2 | 5/2004 | Davis et al. |
| 6,771,237 B1 | 8/2004 | Kalt |
| 6,804,040 B2 | 10/2004 | Malvino et al. |
| 6,897,786 B1 | 5/2005 | Kalt et al. |
| 6,897,997 B2 | 5/2005 | Malvino |
| 6,899,380 B2 | 5/2005 | Kralik et al. |
| 6,900,923 B2 | 5/2005 | Chakrapani et al. |
| 6,936,193 B2 | 8/2005 | Saxe et al. |
| 6,987,602 B2 | 1/2006 | Saxe |
| 7,083,226 B2 | 8/2006 | Schoenauer et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,361,252 B2 | 4/2008 | Slovak et al. |
| 7,367,614 B2 | 5/2008 | Uehara et al. |
| 7,387,329 B2 | 6/2008 | Mollick et al. |
| 7,417,785 B2 | 8/2008 | Malvino |
| 7,530,630 B2 * | 5/2009 | Jugl et al. ...................... 296/214 |
| 7,626,749 B2 | 12/2009 | Baur et al. |
| 7,645,977 B2 | 1/2010 | Schlam et al. |
| 7,705,826 B2 | 4/2010 | Kalt et al. |
| 7,730,668 B2 | 6/2010 | Dankert et al. |
| 7,791,788 B2 | 9/2010 | Slovak et al. |
| 7,847,033 B2 | 12/2010 | Chakrapani et al. |
| 7,967,362 B2 | 6/2011 | Glaser |
| 8,035,075 B2 * | 10/2011 | Schlam et al. ............ 250/214 B |
| 8,134,112 B2 | 3/2012 | Schlam et al. |
| 2006/0082192 A1 * | 4/2006 | Dubay et al. .................. 296/214 |
| 2007/0145785 A1 * | 6/2007 | Uehara et al. ................. 296/214 |
| 2008/0106124 A1 * | 5/2008 | Snider .......................... 296/215 |
| 2008/0115428 A1 * | 5/2008 | Schlam et al. ................ 52/173.1 |
| 2008/0190571 A1 * | 8/2008 | Wimmer ....................... 160/310 |
| 2011/0030276 A1 | 2/2011 | Smith et al. |
| 2013/0076057 A1 * | 3/2013 | Hagen et al. ................ 296/96.14 |

OTHER PUBLICATIONS

International Search Report from PCT application No. PCT/US2012/043729, dated Sep. 21, 2012.

* cited by examiner

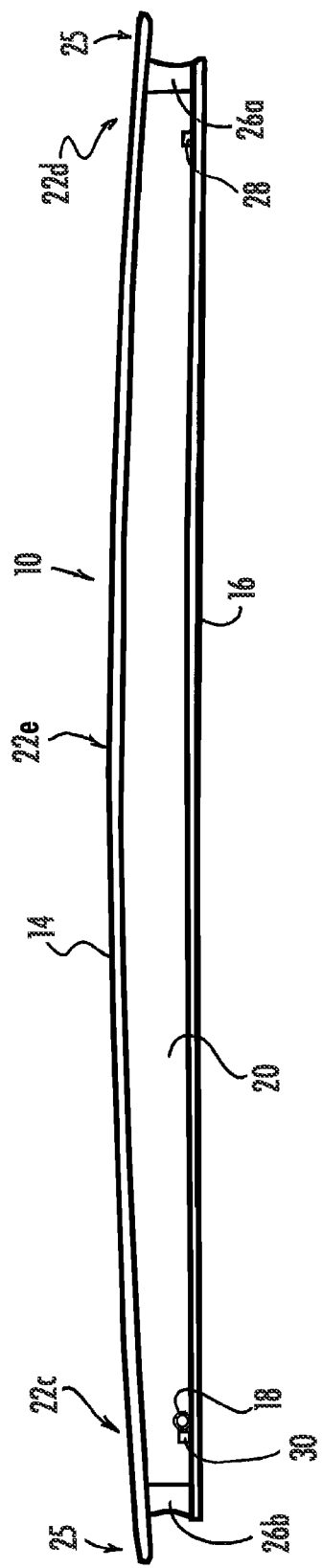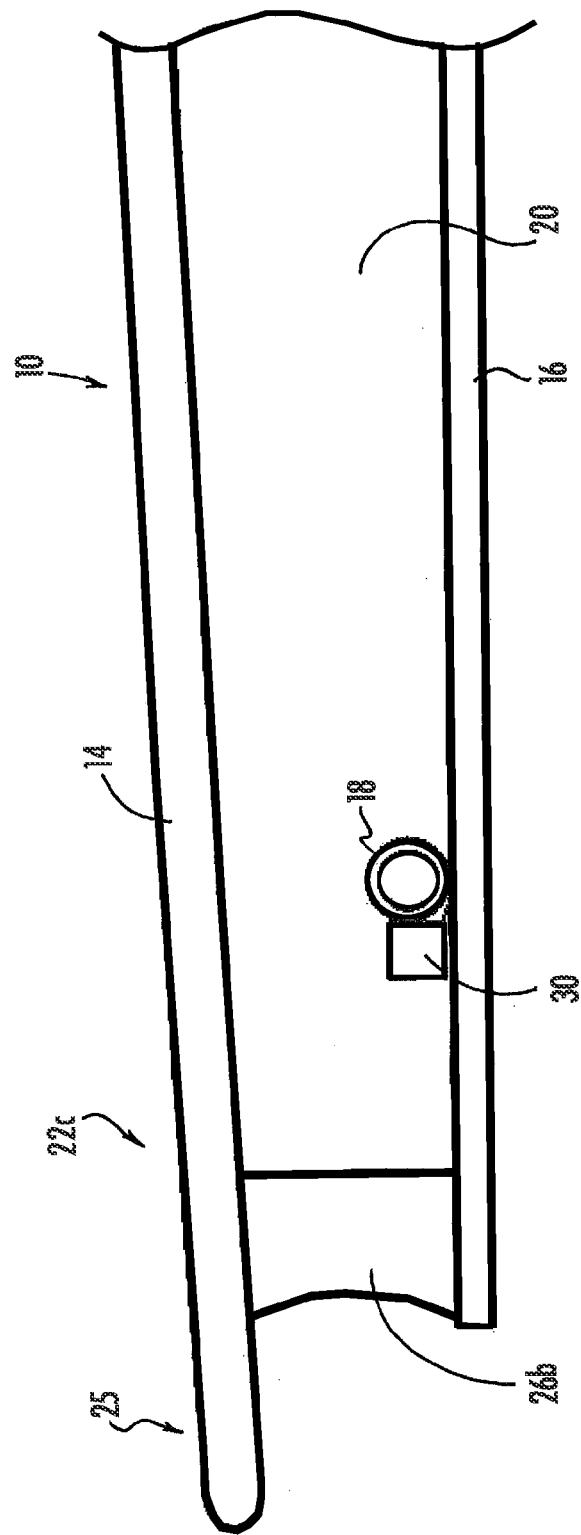

VEHICLE WINDOW WITH SHADE

CROSS REFERENCE TO RELATED APPLICATIONS

The present application is a 371 national phase application of PCT Application No. PCT/US2011/033515, filed Apr. 22, 2011, which claims the benefit of U.S. provisional application Ser. No. 61/447,994, filed Mar. 1, 2011, and Ser. No. 61/327,181, filed Apr. 23, 2010, which are hereby incorporated herein by reference in their entireties.

FIELD OF THE INVENTION

The present invention relates to a window assembly for a vehicle and, more particularly, a window assembly for a vehicle that includes a shade.

BACKGROUND OF THE INVENTION

It is known to provide a window assembly for a vehicle that includes a shade that is movable between an open position and a closed or shading position. Examples of such shades are described in U.S. Pat. Nos. 7,645,977; 6,520,239; 7,083,226; 6,899,380; 6,513,864; and 6,520,239, which are hereby incorporated herein by reference in their entireties.

SUMMARY OF THE INVENTION

The present invention provides a window assembly that provides for shading of the window panel having a pair of spaced apart glass or plastic window panels. The outer window panel may be oversized relative to the inner window panel and may have cross-dimensions that are greater than the inner window panel so as to have perimeter overhang regions at least partially around the window assembly, which may provide enhanced mounting means for mounting the window assembly to the vehicle and may provide an enhanced appearance of the window assembly to a person viewing the window assembly from exterior of the vehicle. The curvatures and contours of the inner and outer window panels may be different and the spacing between the window panels may vary, so as to provide a desired curvature or contour for each window panel relative to the respective vehicle surface at which they are disposed. The shading means or shading element may comprise any suitable means, such as, for example, a coilable shading element or sheet (such as a tightly coiled conductive film, such as, for example, a metalized polymeric film or the like) that is disposed in a cavity between an inner window panel and an outer window panel and that dims or darkens the window assembly via uncoiling of the shading element.

According to an aspect of the present invention, a window assembly of a vehicle (such as for a sunroof or moonroof type window of a vehicle) includes an outer window panel, an inner window panel and a spacer element disposed between the inner and outer window panels to establish an interpane cavity between the inner and outer window panels. At least one of (a) the outer window panel has larger cross dimensions relative to the inner window panel to provide overhang regions of the outer window panel, and (b) the inner window panel has a different contour or curvature than that of the outer window panel so that the interpane cavity varies in gap distance across the window assembly. A roller shade or shade element is disposed in the cavity and is electrically deployable via electrostatic action to coil and uncoil between a coiled light transmitting condition, where the roller shade functions to substantially allow light transmission through the window assembly, and an at least partially uncoiled light attenuating or light blocking condition, where the roller shade functions to at least partially attenuate or block light transmission through the window assembly.

In one form, the roller shade comprises a coilable/uncoilable sheet or film (such as a flexible or coiled conductive film, such as a metalized polymeric film or the like) that is adjustable between a coiled or retracted position, where the roller shade is coiled or retracted to be generally at least partially along a perimeter region of the window assembly, and an uncoiled or extended position, where the roller shade is uncoiled to at least partially cover the inner window panel, with the roller shade limiting or reducing light transmission through the window panels and the window assembly when the roller shade is at least partially uncoiled. Optionally, the shade element or shading means may include other suitable shading means, such as electro-optic shading means, such as for example, liquid crystal shading devices or electrochromic shading devices and/or suspended particle devices (SPD), or the like.

The roller shade may comprise a conductive film that is tightly coiled in its coiled state and that uncoils in response to a voltage applied thereto. Optionally, one or more roller shades may be disposed within the cavity of the window assembly to provide a desired shading scheme and one or more degrees of shading or degrees of light transmission through the window assembly. Optionally, a perimeter region of the window assembly may be curved and the roller shade film and an end stop element may be formed to provide contact between an end of the film and the end stop element when the film is uncoiled to its light blocking or light attenuating state or position.

In another form, the outer window panel has larger cross dimensions relative to the inner window panel to provide overhang regions of the outer window panel. Optionally, the outer window panel may have a darkened perimeter layer or coating about its periphery so as to at least partially conceal the presence of the spacer element from view by a person viewing the window assembly from external the vehicle when the window assembly is normally mounted at the vehicle. The darkened perimeter layer may at least partially conceal the presence of a portion of the vehicle that is disposed around the inner window panel to support the window assembly at the vehicle when the window assembly is normally mounted at the vehicle. The outer window panel may have an outer surface that is generally flush with an outer surface of at least one of (a) an outer panel of the vehicle and (b) a windshield of the vehicle and (c) a rear backlite of the vehicle.

In another form, the inner window panel may have a different contour or curvature than that of the outer window panel so that the interpane cavity varies in gap distance across the window assembly. An outer surface of the outer window panel may correspond with a contour of an outer surface of at least one of (a) an exterior panel of the vehicle and (b) a windshield of the vehicle and (c) a rear backlite of the vehicle, and an in-cabin surface of the inner window panel may correspond with a contour of an in-cabin surface of an interior panel or headliner or trim element of the vehicle.

The roller shade is electrically operable to adjust between the coiled light transmitting condition and the at least partially uncoiled light attenuating or light blocking condition, and electrical connection is made between the roller shade and a vehicle power source to provide electrical power to the roller shade. Optionally, window assembly may comprise a movable window assembly that is movable relative to the vehicle at which it is mounted between opened and closed positions. Optionally, the electrical connection may be made to the roller shade irrespective of a position of the movable window assembly relative to the vehicle.

These and other objects, advantages, purposes and features of the present invention will become apparent upon review of the following specification in conjunction with the drawings.

BRIEF DESCRIPTION OF THE DRAWINGS

FIG. 4 is a sectional view of the window assembly of FIG. 1;

FIG. 5 is an enlarged sectional view of a portion of the window assembly of FIG. 4;

DESCRIPTION OF THE PREFERRED EMBODIMENTS

Figure 1:
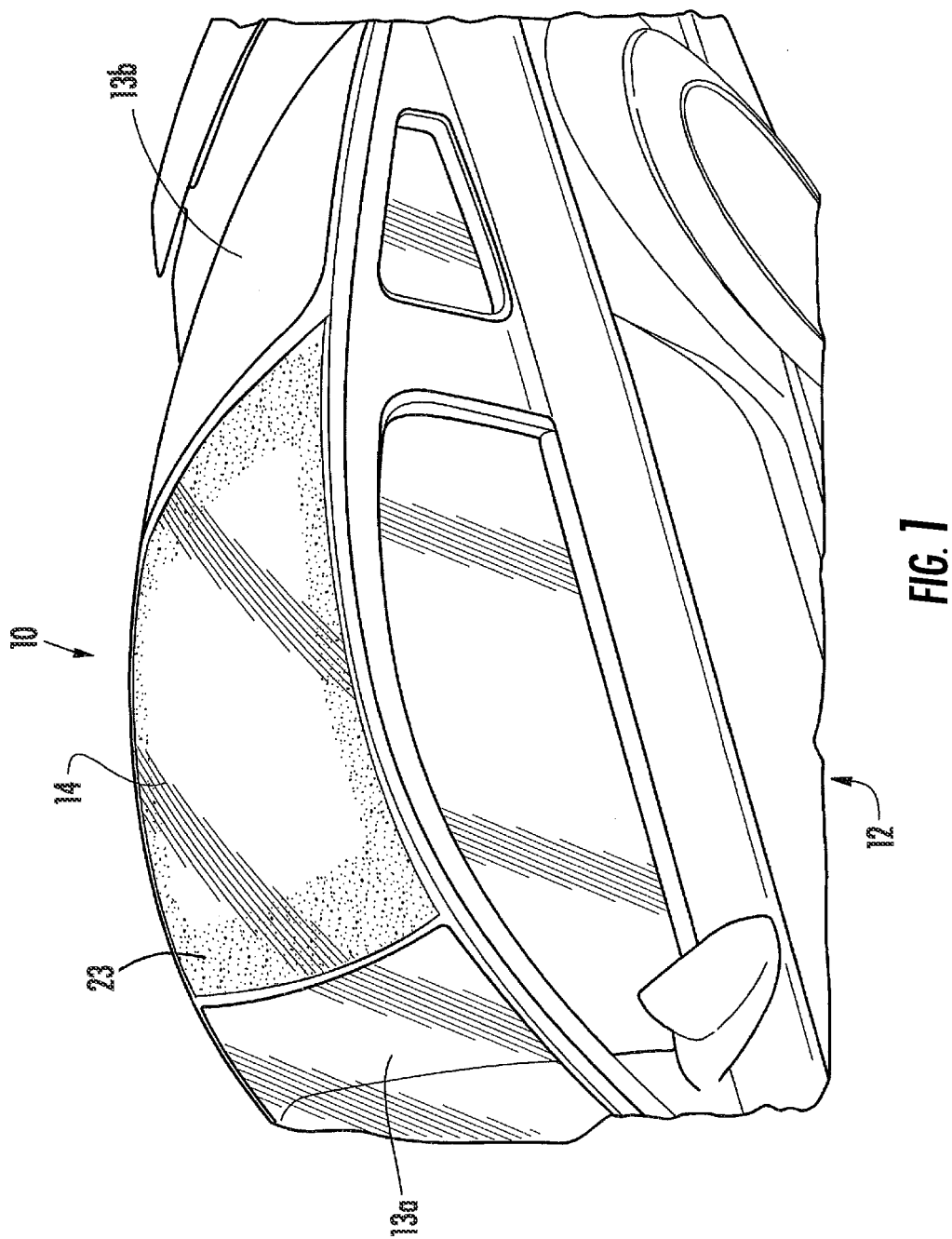
FIG. 1 is a perspective view of a portion of a vehicle having a window assembly in accordance with the present invention.

Referring now to the drawings and the illustrative embodiments depicted therein, a window assembly or module 10 (such as a sunroof or moonroof or the like or such as a side or rear window or the like) of a vehicle 12 includes an outer window panel 14 and an inner window panel 16 with a coiled shade element 18 disposed therebetween (FIGS. 1-5). In the illustrated embodiment, window assembly 10 comprises a roof module or roof window (such as a sunroof or moonroof or glass roof or the like) that is disposed between a front windshield 13a of vehicle 12 and a rear backlite or rear window 13b of vehicle 12 (such as at an opening in the roof of the vehicle or otherwise between the windshield and backlite of the vehicle, such as by utilizing aspects of the glass roof assembly described in U.S. patent application Ser. No. 11/933,699, filed Nov. 1, 2007 and published May 8, 2008 as U.S. Pat. Publication No. US-2008-0106124, which is hereby incorporated herein by reference in its entirety). The coiled shading element 18 is coiled or retracted to an open or non-shading position, and may uncoil or extend across the window assembly to a closed or shading position, such as in response to a user input or the like, as discussed below. The window module or window assembly 10 has an outer window panel 14 (or upper panel for the roof window application) that has greater cross dimensions than the inner panel 16 (or lower panel for the roof window application), and provides a uniform or flush outer panel at the exterior surface of the vehicle sheet metal and/or front windshield and rear backlite, as also discussed below. The outer and inner window panels 14, 16 of window module or window assembly 10 may have different contours or curvatures (and thus define or establish a non-uniform spacing or cavity therebetween), and thus may provide enhanced matching or correspondence with the contours of the respective surfaces of the vehicle sheet metal and/or front windshield and rear backlite and of the interior or in-cabin roof liner or headliner, as also discussed below.

Figure 2:
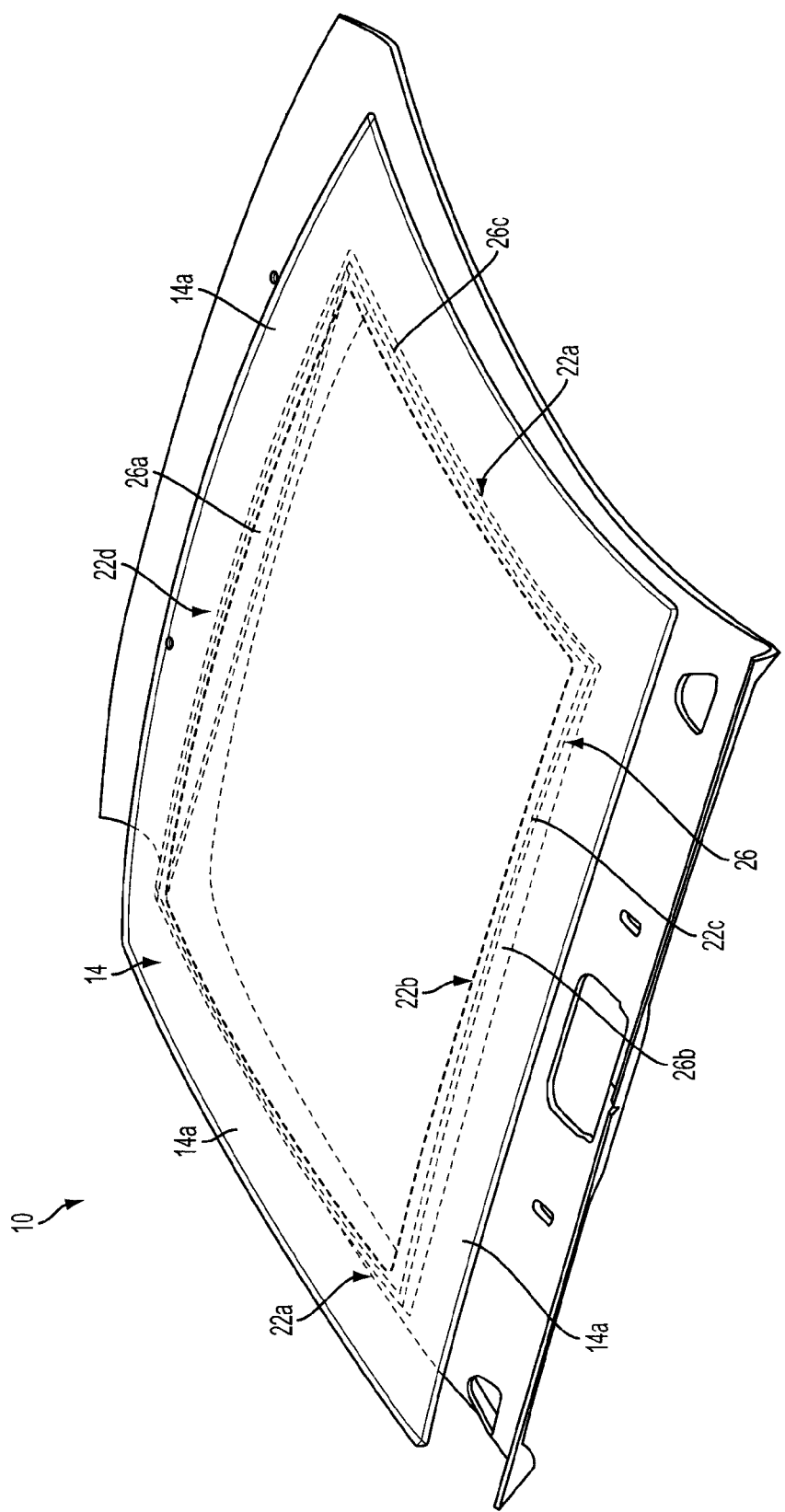
FIG. 2 is a perspective view of the window assembly of FIG. 1.
Figure 3:
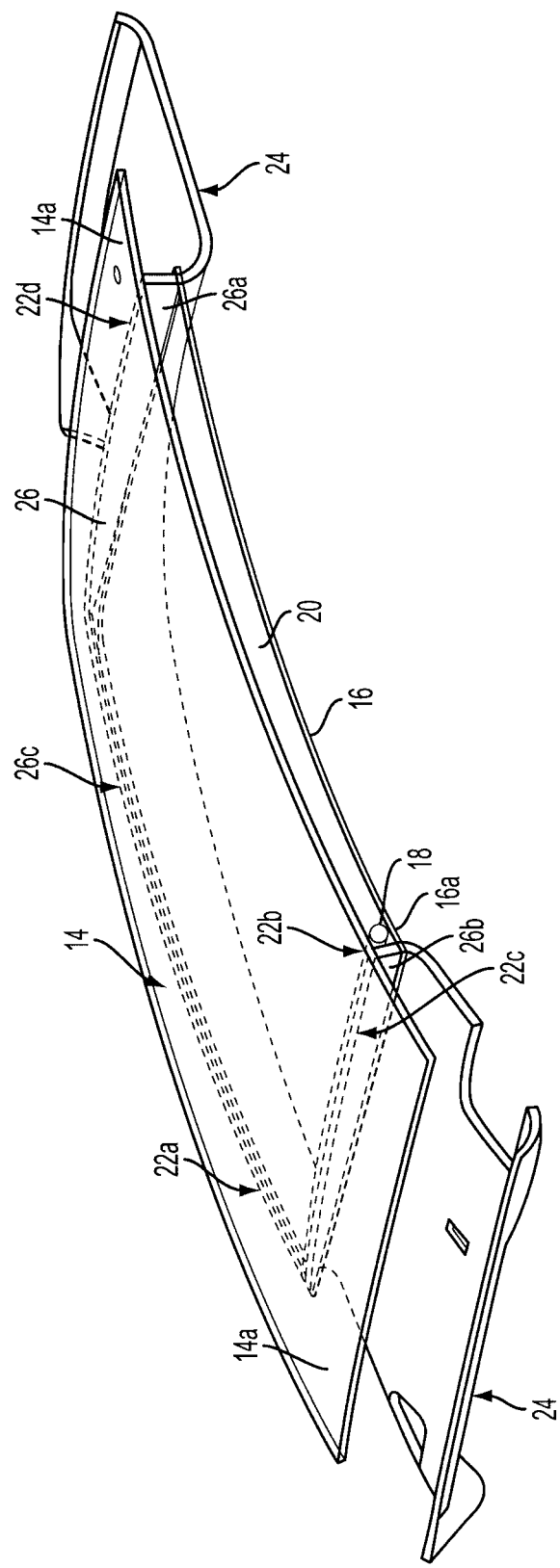
FIG. 3 is a perspective and partial sectional view of the window assembly of FIG. 2.

As shown in FIGS. 2 and 3, window panels 14, 16 are spaced apart to define an interpane cavity 20 therebetween, within which the shade element 18 is disposed. Window panels 14, 16 may comprise any suitable materials or panels, such as transparent glass panels, such as tempered glass panels or laminated glass panels or the like, and optionally may comprise glass panels with a low-'E'missivity coating or treatment, such as on a surface of the panel or panels that faces the cavity 20. As best shown in FIGS. 3-5, the thickness or spacing dimension of the cavity 20 varies across the window assembly, such that the window panels 14, 16 may have different curvatures or profiles to conform with the inner roof or headliner contours and the outer roof or sheet metal contours, in order to provide an aesthetically pleasing appearance at the interior and exterior of the vehicle. In the illustrated embodiment, the side perimeter regions 22a of the window assembly 10 have a narrowed cavity thickness or depth, with the cavity thickness (or separation distance or gap between the window panels 14, 16) increasing towards its largest gap dimension at about the lateral center region 22b (between the side perimeter regions) of the window assembly. Thus, the shade element 18 is configured to be narrow enough or low profile enough to move along the side perimeter regions 22a (such as from the rear perimeter portion 22c towards the front perimeter portion 22d or vice versa) between its open and closed or shading positions. As shown in FIGS. 4 and 5, the profile of the window assembly may vary between the rear and front perimeter portions 22c, 22d, such that the cavity thickness increases towards its largest gap dimension at about the longitudinal center region 22e (between the front and rear perimeter regions) of the window assembly. Clearly, other profiles may be envisioned that would have a varying gap between the panels with the largest gap dimension or dimensions at different locations between the front and rear perimeter portions and/or the side perimeter portions, while remaining within the spirit and scope of the present invention.

In the illustrated embodiment, and as shown in FIGS. 2-5, outer window panel 14 has larger cross-dimensions than inner window panel 16, such that the perimeter regions of outer window panel 14 extend beyond or overhang corresponding perimeter regions of inner window panel 16. The overhang regions 25 may extend along one or more of the perimeter edges of the window assembly. The degree of overhang (or overhang dimension) of the outer window panel relative to the inner window panel may vary depending on the particular application (such as on the sheet metal opening of the vehicle and curvature of the vehicle body or roof and the headliner shape and contours) and desired mounting surfaces and appearances of the window assembly and vehicle. For example, for flatter or more planar window applications, a smaller or reduced overhang region or regions may be appropriate, but for applications with a greater curvature of the window panel or panels, a greater overhang dimension or dimensions may be appropriate. The overhanging perimeter regions 14*a* of outer window panel 14 (and a portion of the window panel inboard of the overhang regions) may have a darkened layer or hiding layer 23 (such as a ceramic frit layer or the like) established thereat (such as at an inner or lower surface of the outer window panel) to substantially hide or conceal or render covert the vehicle frame or sheet metal 24 at which the window assembly is mounted and the perimeter sealing and/or spacing element 26 and the coiled shading element 18 (when in its coiled or retracted state).

Optionally, the inner and outer window panels may have similar or the same cross-dimensions (without overhang regions), depending on the particular application of the window assembly. In such a non-overhang application, the perimeter regions of the outer window panel may have a darkened layer or hiding layer (such as a ceramic frit layer or the like) established thereat (such as at an inner or lower surface of the outer window panel) to substantially hide or conceal or render covert the vehicle frame or sheet metal at which the window assembly is mounted and the perimeter sealing and/or spacing element and the coiled shading element (when in its coiled or retracted state) sandwiched between the window panels and within the interpane cavity of the window assembly.

As shown in FIGS. 2-5, the window panels 14, 16 are spaced apart and joined together via a sealing element or spacer element 26 that is disposed at and around the perimeter regions of the upper or cavity facing surface of the inner window panel 16. The outer window panel 14 is attached at sealing element 26, with the sealing element 26 engaging the cavity facing surface of the outer window panel 14 inboard of the perimeter edges of the outer window panel. Thus, the sealing element 26 functions to space the window panels 14, 16 apart from one another (to establish the interpane cavity 20) and to secure or join the window panels together to form the double pane window assembly 10.

The form or profile of the sealing elements and thus of the gap or interpane cavity may vary depending on the particular application and differences between the exterior surface contour or profile of the vehicle and the interior surface contour or profile of the vehicle. It is envisioned that the minimum gap must be at least large enough to receive the coiled shade element along the perimeter region at which the coiled shade element is located. The gap or spacing distal from or remote from that perimeter region may be reduced since it may only have to provide clearance for the shade film or element in its uncoiled or partially or mostly uncoiled state. For example, the gap or spacing dimensions of the interpane cavity may vary from a minimum of approximately 1 mm or thereabouts (or more or less) to a maximum of about 10 mm or thereabouts (or more or less), depending on the particular application of the window assembly. Optionally, it is envisioned that the window panels may have similar or the same curvatures or profiles such that the gap dimensions are substantially constant or uniform between the window panels, such as for applications where the outer surface of the vehicle is similar to or has a similar profile or contours as the inner surface or in-cabin surface of the vehicle at the location at which the window assembly is mounted.

As can be seen with reference to FIG. 1, the outer surface of the outer window panel 14 may be generally flush with the outer or exterior surface of the sheet metal and/or window panels and/or exterior trim panels or headers of the vehicle to provide a uniform or flush mounted roof window module or the like (such as a side window panel or windshield or backlite or the like). The lower surface of the outer window panel may be adhered or bonded to one or more flanges or attachment surfaces of the vehicle sheet metal or frame or structure, while the inner window panel may generally hang from the outer window panel (for vehicle roof applications) and may also be attached to or engaged with one or more interior trim elements within the vehicle cabin and along the ceiling of the vehicle cabin. As best shown in FIG. 3, the in-cabin surface of the inner window panel 16 may engage and/or be supported at the vehicle sheet metal 24 or other mounting structure to attach the window assembly at the vehicle. The window module may utilize aspects of the window modules described in U.S. patent application Ser. No. 11/933,699, filed Nov. 1, 2007, and published May 8, 2008 as U.S. Patent Publication No. US-2008-0106124, which is hereby incorporated herein by reference in its entirety.

Optionally, and desirably, shade element 18 (FIGS. 3-5) comprises a conductive shade element, such as an electro-polymeric or metalized polymeric shade element or film or the like, that has a thin rolled up or coiled conductive film, such as a metalized polymeric film or the like, that is responsive to electrostatic action, and that unrolls when a voltage is applied thereto, such as by utilizing aspects of the insulated glazing units described in U.S. Pat. No. 7,645,977, which is hereby incorporated herein by reference in its entirety. The coiled film is coiled or retracted to an open or non-shading position in the absence of a voltage applied thereto, and may at least partially uncoil or extend across the window assembly to a closed or shading position or partially shading position responsive to a voltage applied thereto.

For such an electro-polymeric shade element, the glass window panels may comprise low-'E'missivity glass and a dielectric polymer may be laminated on or otherwise applied to the low-E surface (the surface facing the cavity) of the lower panel 16 to act as a dielectric between the low-E surface and the retractable coiled-up electrode or shading element (optionally, the dielectric polymer and the shading element may be disposed at the cavity facing surface of the upper or outer window panel while remaining within the spirit and scope of the present invention). A strip of the low-E surface along one of the perimeter edge regions (such as the rear or front perimeter edge region for the roof module or roof window assembly and/or such as a lower perimeter edge region for a side or rear or front window assembly) of the inner or smaller window panel 16 may be exposed (i.e., not coated with the dielectric polymer) around the perimeter of the window panel 16 (or at least at and along the forward and rearward perimeter regions for a shading element that opens and closes in a fore/aft direction with respect to the vehicle, such as shown in FIGS. 3-5, or at and along the lateral or side perimeter regions for a shading element that opens and closes in a cross-car direction with respect to the vehicle) to provide an exposed or non-dielectric-coated strip or region of the window panel on which to attach a lead wire of the shield or shading element.

As shown in FIG. 4, an end stop 28 (such as a metallic wire or element, such as an aluminum rectangular wire or element or the like) may be disposed at and/or adhered to the to the window panel 16 inboard of the perimeter seal 26 and at and along a perimeter region of the window panel opposite from where the coiled conductive or metalized polymeric film is disposed. The metallic wire or element is disposed at and along an opposite side of the perimeter seal from the exposed or non-coated strip or perimeter region of the window panel.

The end stop or metallic wire limits or substantially precludes contact of the uncoiled end of the polymeric shade element or film with the dielectric surface of the panel to facilitate faster response times when the shade element is being retracted or recoiled towards its non-shading or coiled position. The end stop 28 functions to help align the unrolled end of the film when it is fully unrolled or deployed and also discharges the unrolled film when the film contacts the end stop 28. The end stop may comprise a metallic material or other suitable material or suitable conductive material, and may be plastic coated or the like, such as coated with a low dissipation factor polymer, such as, for example, polypropylene, fluorinated ethylene propylene (FEP) or polytetrafluoroethylene (PTFE) or the like.

At and along the perimeter region where the coiled shade element or film is attached (such as at the rear perimeter region 16a of the inner or lower window panel 16), a copper tape (or other suitable metallic or conductive element) may be adhered (such as via a conductive adhesive or the like) at a perimeter edge region of the window panel. The copper tape may be adhered to the window panel or substrate inboard of the sealing element 26, and the coiled shade element may be adhered at the copper strip or tape and at the window panel inboard of the sealing element, such as via a conductive epoxy or paste or the like. As shown in FIGS. 4 and 5, another end stop 30 may be disposed at and along the perimeter region where the coiled shade element or film 18 is attached. The film, when coiled or retracted, rests at or against the end stop 30, which functions to align the film along the end stop when the film is fully retracted or coiled to its non-shading state.

The coiled film or shade element comprises a conductive film (such as a metalized polymeric film or the like) and has a conductive or metallic side of the film facing the window panel to which it is attached, such that the conductive or metallic side of the film is bonded to the copper tape or strip via the conductive adhesive. The metalized polymeric film is coiled and disposed at the window panel with its metal side or surface at the outside diameter of the rolled or coiled film. The film may be cut or formed to the desired width and length and may be tightly wound on mandrels or rods, and then heat soaked in an oven to establish the coiled-up electrode and to further contract the wound film tighter. The mandrel may be removed from within the coiled film prior to attaching the coiled film at the window panel and at or near the copper strip or tape. The coiled film may be fixtured and bonded to the adhesive along and inboard of the sealing element or spacer 26.

Optionally, multiple coiled films may be used to provide different shading applications. For example, a coiled shade element or film may be disposed at and coiled/uncoiled along the inner or lower window panel and a second coiled shade element or film may be disposed at and coiled/uncoiled along the outer or upper window panel (or along an intermediate window panel disposed between the outer and inner window panels), to provide up to three degrees of shading if each film provides a different degree of shading (for example, a first degree of shading may be provided when only the first film is uncoiled, while a second degree of shading may be provided when only the second film is uncoiled and a third degree of shading may be provided when both films are uncoiled). Optionally, two (or more) coiled films may be disposed adjacent to one another or otherwise on the same window panel, with each film covering or shading a different portion of the window when uncoiled. For example, a first film may be disposed at the forward or rearward perimeter region to extend and cover one side (such as the driver side) of the window, while the other or second film may be disposed at the forward or rearward perimeter region to extend and cover the other side (such as the passenger side) of the window, with each film being coiled and uncoiled responsive to a separate user input. Optionally, a first film may be attached along one side of the window and a second film may be attached along the other side of the window, whereby the films may uncoil towards the center region of the window to selectively cover or shade a respective side of the window assembly, such as in response to a respective user input or the like. Other configurations and quantities of films may be disposed within the interpane cavity to individually shield or shade respective portions of the window panels while remaining within the spirit and scope of the present invention. The films thus may, for example, be coiled at the front perimeter region or the rear perimeter region (or one film coiled at the front perimeter region and one film coiled at the rear perimeter region) or the films may be coiled at one or both side perimeter regions or the films may be coiled at a central region and may uncoil towards one or more of the front, rear and side perimeter regions, while remaining within the spirit and scope of the present invention.

When uncoiled, the film or films may provide a desired degree of shading at the window assembly, and may be provided in any suitable color, depending on the particular application of the window assembly. For example, the film or films may be painted or inked or screen printed or coated with a dark or black coating to provide a dark or black colored shading of the window assembly, or the film or films may be painted or inked or screen printed or coated with any other colored coating or layer or the like to provide the desired appearance of the shaded window assembly. Optionally, for example, the film or films may be colored or tinted or patterned (such as with a vehicle manufacturer logo or any desirable or suitable pattern or the like) to match the interior or exterior color scheme or trim scheme of the particular vehicle or vehicle manufacturer, or the film or films may be colored or tinted to match a selected color scheme as selected by the vehicle, manufacturer or the vehicle owner or the like, such as by utilizing aspects of the mirror assemblies described in U.S. Pat. Nos. 7,289,037; 7,626,749; and/or 7,255,451, which are hereby incorporated herein by reference in their entireties.

The film or films may provide any desired or appropriate degree of shading and thus may function to block or attenuate a desired or appropriate percentage of light incident at the window assembly. For example, the film may block or attenuate at least about 40 percent of the visible light incident at the window assembly, and preferably may block or attenuate at least about 60 percent of the visible light incident at the window assembly, more preferably at least about 80 percent of the visible light incident at the window assembly (or the film may block or attenuate less than about 40 percent of the visible light incident at the window assembly), and it is envisioned that the film may block up to about 100 percent of the visible light incident at the window assembly (so as to provide a generally or substantially opaque or non-light-transmissive window or sunroof), depending on the particular application of the window assembly and desired shading of the window when the shading element is deployed. The degree of light transmissivity or light attenuation of the film or shade element may be varied by varying the thickness of the ink layer or coating on the polymeric film roll or by including a metallic coating or light absorbing layer or light reflecting layer at the polymeric film roll or the like.

The perimeter seals or spacers 26 are disposed around the perimeter of the smaller window panel of the window assembly and may comprise any suitable material. For example, the spacers may comprise an extruded (or otherwise formed, such as via molding or the like) rubber product with a polyisobutylene (PIB) adhesive and peel liner on two (opposite) edges, whereby the peel liner may be removed from one edge of the spacer for attachment of the spacer to one of the window panels (such as the smaller or inner window panel) and the peel liner may be removed from the opposite edge for attachment of the spacer to the other of the window panels (such as the larger or outer window panel). The spacers may be formed to have the desired profile so as to provide the desired spacing along the perimeter edge regions of the window assembly. For example, and as shown in FIG. 3, the forward and rearward spacing elements 26a, 26b may have a thicker central region and may taper or curve towards thinner end regions, while the side spacing elements 26c may be substantially uniform or may provide any other desired or selected profile to correspond with the contours or curvatures of the cavity facing surfaces of the window panels 14, 16. Separate corner spacers may be provided to space and seal the window panels at the corner regions, or the front, rear and side spacing elements may abut one another to seal at the corner regions, or a unitary perimeter spacing element may be formed that is disposed around the entire periphery of the window panel. After the spacers are attached to one of the window panels (such as the panel to which the coiled shade element or film is attached, such as the lower or inner window panel), the peel liner may be removed from the opposite edge of the spacer and the other window panel (such as the outer or larger window panel) may be affixed or adhered to the spacers. Optionally, after the window assembly is so assembled, the atmosphere within the interpane cavity may be displaced, such as with an inert gas, such as Argon or the like. Optionally, a resilient material, such as an RTV silicone or the like, may be used to fill the space outboard of and along the spacing elements to the edge of the smaller or inner glass.

Figure 6:
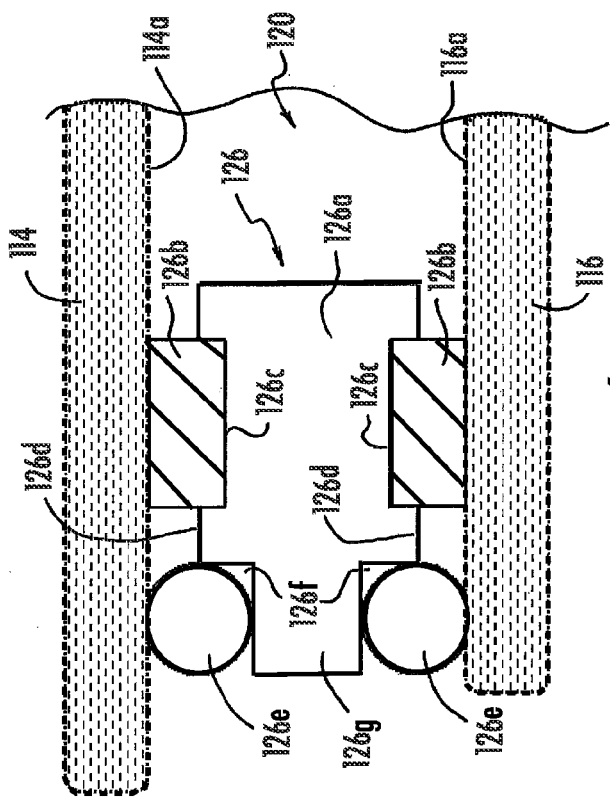
FIG. 6 is a sectional view of a spacer and sealing assembly suitable for spacing the panels of the window assembly apart in accordance with the present invention.

Optionally, for example, and with reference to FIG. 6, a spacing element or spacer or perimeter spacer 126 may comprise a spacer body 126a, such as an elongated plastic or polymeric or metallic body that extends along at least one perimeter region of the window assembly between the window panels. The spacer body 126a may be attached or bonded to the inner surfaces 114a, 116a of the window panels 114, 116 via any suitable attaching means, such as an adhesive 126b or the like disposed along the spacer body 126a, and optionally disposed in a recess or channel 126c formed or established along the surfaces 126d of the spacer body that mate with or attach to the inner surfaces 114a, 116a of the window panels 114, 116. Optionally, and as shown in FIG. 6, the spacer 126 may include one or more butyl sealant beads 126e disposed outboard of the cavity 120 established between the window panels 114, 116 (such as along and partially in a channel or notch 126f established along an outboard edge region 126g of the spacer body 126) to substantially seal the outer perimeter region of the spacer relative to the window panels to limit or substantially preclude moisture or water intrusion into the cavity 120 of the window assembly. Although shown as being spaced from the inner surfaces 114a, 116a of the window panels 114, 116 in FIG. 6, clearly, the adhesive 126b and the butyl seals 126e would compress during assembly and manufacture of the window assembly, such that the inner surfaces 114a, 116a of the window panels 114, 116 would mate against or be only slightly spaced from the bonding or attaching surfaces 126d of the spacer body 126a, and would be sealed against and bonded to the spacer body via the adhesive 126b and the butyl seals 126e.

Figure 8:
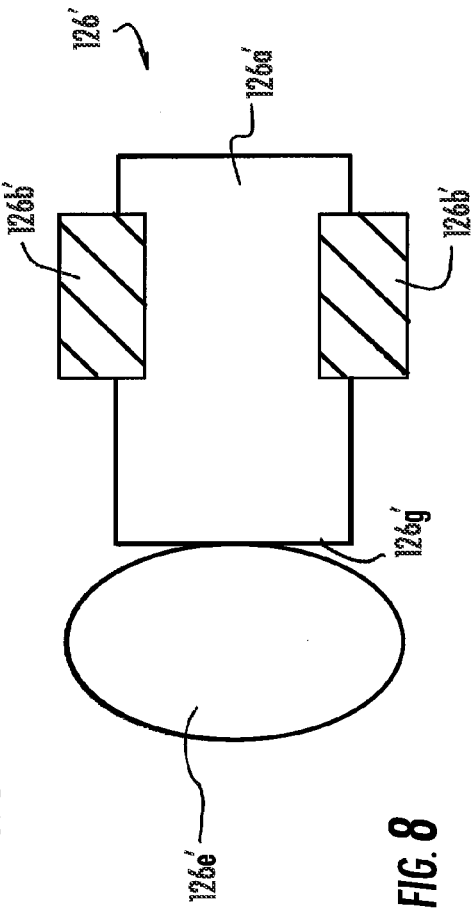
FIG. 8 is a sectional view of another spacer and sealing assembly suitable for spacing the panels of the window assembly apart in accordance with the present invention.

Optionally, and with reference to FIG. 8, the spacer 126' may include a single sealant bead 126e' disposed at the outboard edge region 126g' of the spacer body 126a'. As shown in FIG. 8, the sealant bead 126e' may be disposed along the outer edge region of the spacer body and may be large enough or wide enough to engage and seal against both of the inner surfaces of the window panels (not shown in FIG. 8) when the window panels are adhered to the spacer 126' (such as via adhesive 126b or the like). Spacer 126' may be otherwise similar to spacer 126, discussed above, such that a detailed discussion of the spacers need not be repeated herein.

Figure 7:
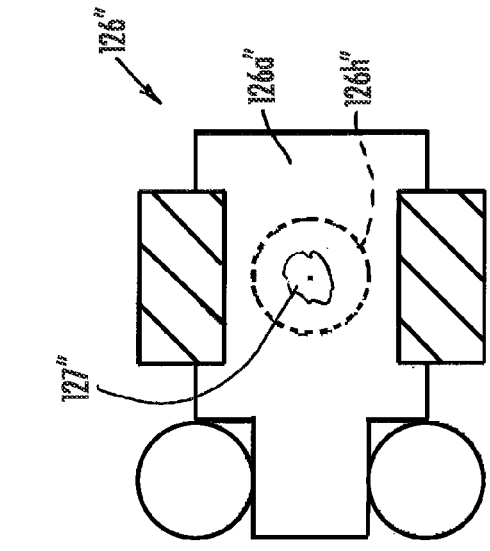
FIG. 7 is a sectional view of another spacer and sealing assembly suitable for spacing the panels of the window assembly apart in accordance with the present invention.

Optionally, the spacer may include means for limiting or removing moisture in the interpane cavity between the window panels. For example, and with reference to FIG. 7, a spacer 126" may include a cavity or channel 126h" established in the spacer body 126a" and at least partially therealong, with the channel 126h" being configured to receive and contain a moisture limiting element 127", such as a desiccant material or the like, such as any suitable hygroscopic substance that induces or sustains a state of dryness (desiccation) in its local vicinity, such as via absorption or adsorption of water, or a combination of absorption and adsorption. Some commonly used desiccants include, for example, silica gel, activated charcoal, calcium sulfate, calcium chloride, montmorillonite clay, molecular sieves and/or the like. Spacer 126" may be otherwise similar to spacers 126, 126', discussed above, such that a detailed discussion of the spacers need not be repeated herein.

Optionally, the window assembly may provide or include two or more shade elements or shading devices or laminates, such as to provide different degrees of shading (for example, a partial shading with one of the shading elements extended or deployed and an enhanced shading when both shading elements are extended or deployed), or to provide shading of different portions of the window assembly (for example, one shade element may extend across or along one portion of the window assembly and another shade element may extend across or along another portion of the window assembly so as to provide selective shading of different portions of window assembly, such as a driver or passenger side of a sunroof or the like). For example, and with reference to FIGS. 9 and 10, a window assembly 210 includes an outer window panel 214 and an inner window panel 216 with two coiled shade elements 218a, 218b disposed (at or along respective end stops 230a, 230b) in the interpane cavity 220 established between the window panels 214, 216 and bounded by a spacer element or elements 226. In the illustrated embodiment, window assembly includes a divider panel 215 disposed between the window panels 214, 216, such as at a diagonal across the interpane cavity 220. The divider panel 215 thus divides the interpane cavity 220 into two cavities or cavity portions 220a, 220b, with the shade elements 218a, 218b being disposed in respective cavities 220a, 220b. The divider panel 215 may comprise any suitable material, such as a transparent glass material or plastic or polycarbonate material or the like.

Figure 9:
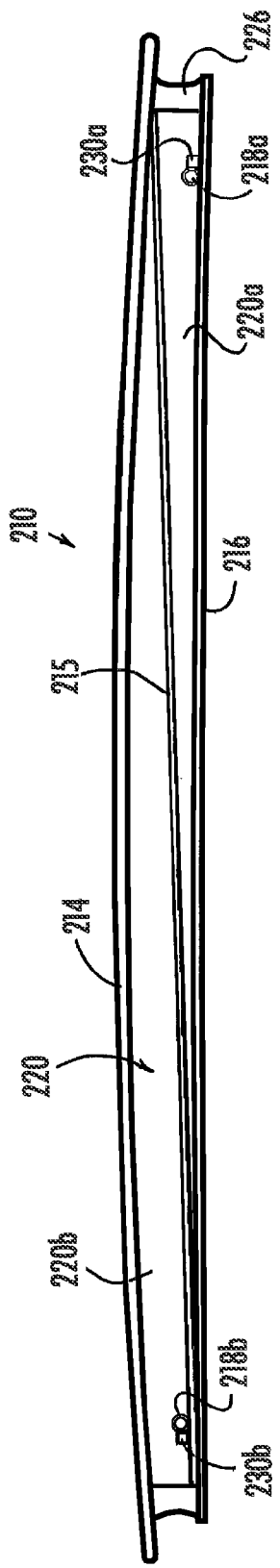
FIG. 9 is a sectional view of another window assembly of the present invention.
Figure 10:
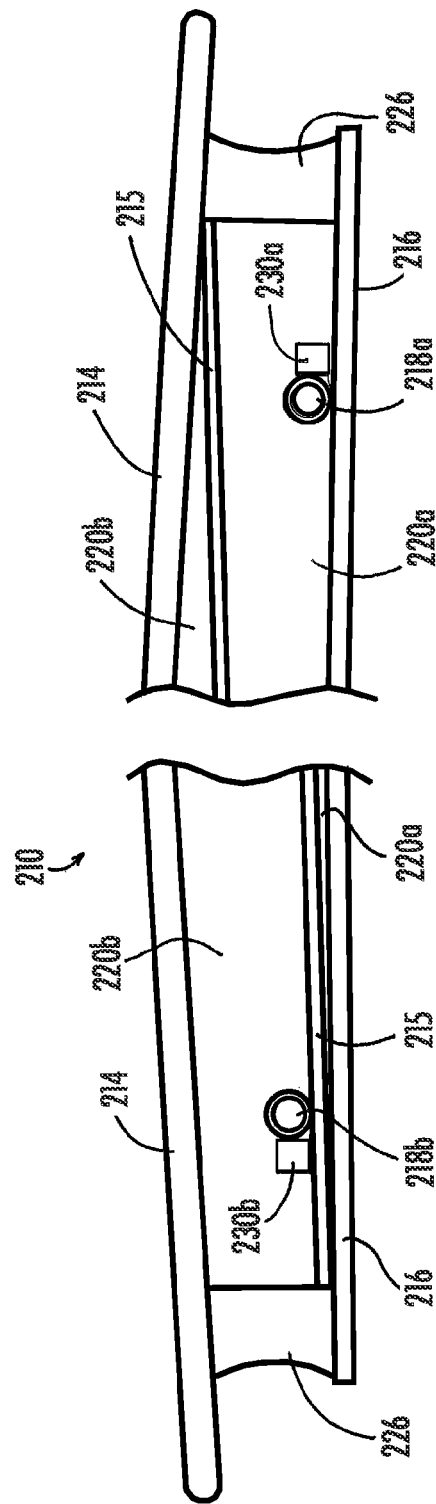
FIG. 10 is an enlarged sectional view of portions of the window assembly of FIG. 9.

In the illustrated embodiment, one of the shade elements 218a is disposed at and is extendable along the inner window panel 216, while the other shade element 218b is disposed at and is extendable along the divider panel 215. As can be seen with reference to FIGS. 9 and 10, the respective cavities 220a, 220b narrow towards the region distal from the coiled shade element, and the panels 214, 215, 216 do not interfere with uncoiling or extension of the shade element because the shade element reduces its diameter as it uncoils or moves or rolls toward the narrowed cavity region distal from the coiled location or initial location of the shade element. Optionally, the divider may be angled as shown in FIGS. 9 and 10, or may be generally parallel to one of the window panels, while remaining within the spirit and scope of the present invention. The shade elements 218a, 218b may comprise shade elements similar to and operable in a similar manner as shade element 18, discussed above, such that a detailed discussion of the shade elements need not be repeated herein.

The coiled film or shading element (or elements) is coiled or retracted to an open or non-shading position in the absence of a voltage applied thereto, and may uncoil or extend across the window assembly to a closed or shading position responsive to a voltage applied thereto. The voltage may be selectively applied via actuation of a user input or the like within the vehicle (such as a button or switch in the cabin of the vehicle, such as at an interior rearview mirror assembly of the vehicle) or the voltage may be automatically applied in response to a sensor or control (such as a control that actuates the shading element to shade the window responsive to a temperature sensor determining that the in-cabin temperature or external temperature has reached a threshold level or the like). The control unit or user input and power source may be attached to electrical connectors of a wire harness or leads of the finished window module or assembly, such as via a quick-connect plug and socket type connection or the like. The shading element may be operable via any suitable powering means. For example, the shading element may operate at about 530 VDC or thereabouts (or more or less) with a parasitic draw of about 150 to about 160 microamps or thereabouts (or more or less). The voltage may vary depending on the film roll and tightness of the film roll when coiled in its retracted state.

Figure 11:
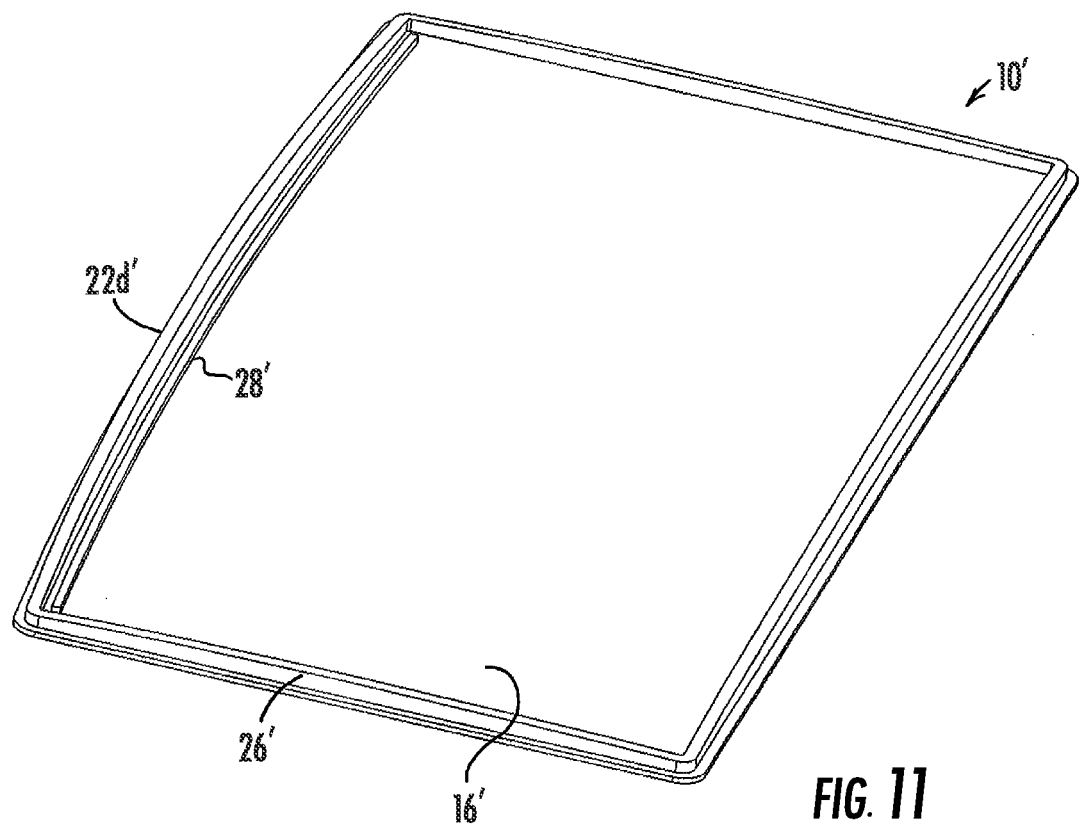
FIG. 11 is a perspective view of another window assembly of the present invention, shown with the outer window panel and shading element removed.
Figure 12:
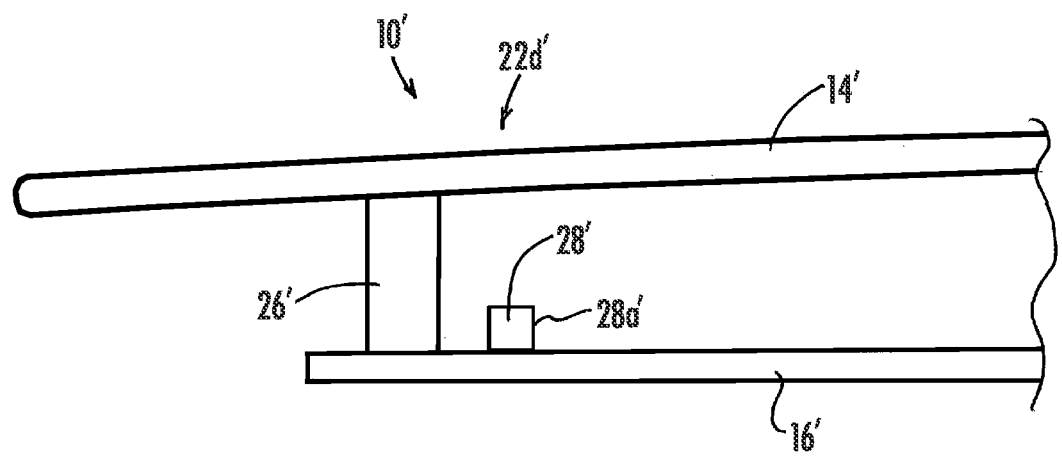
FIG. 12 is a sectional view of a portion of the window assembly of FIG. 11.
Figure 13:
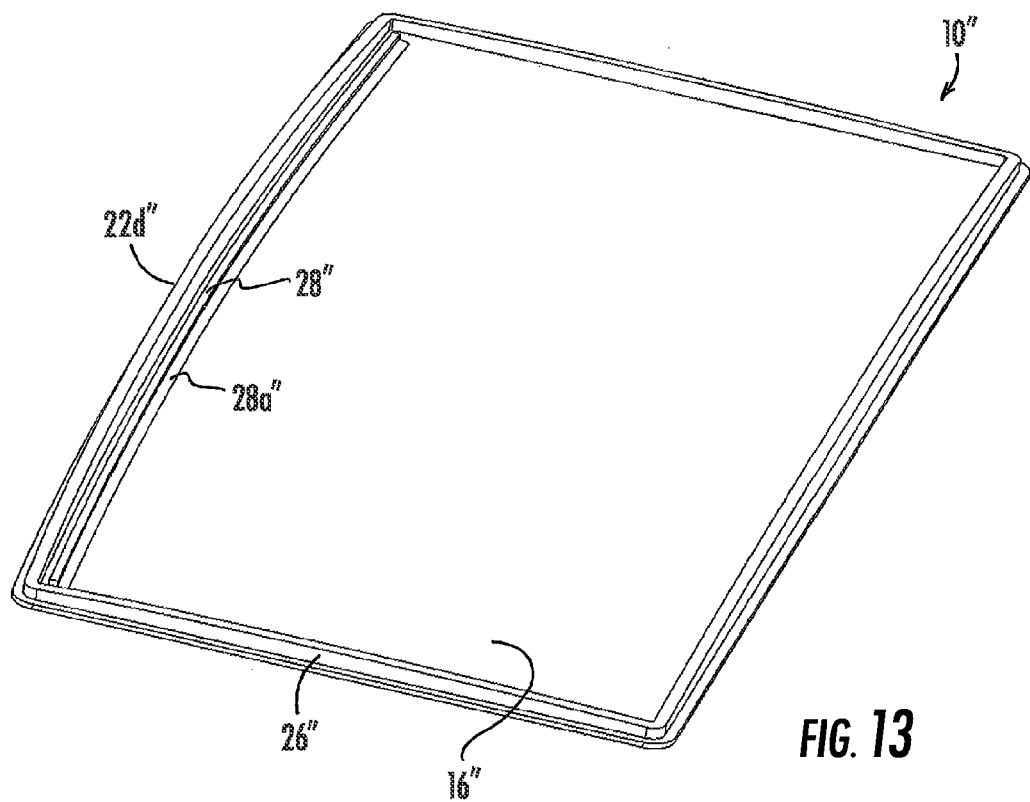
FIG. 13 is a perspective view of another window assembly of the present invention, shown with the outer window panel and shading element removed.
Figure 14:
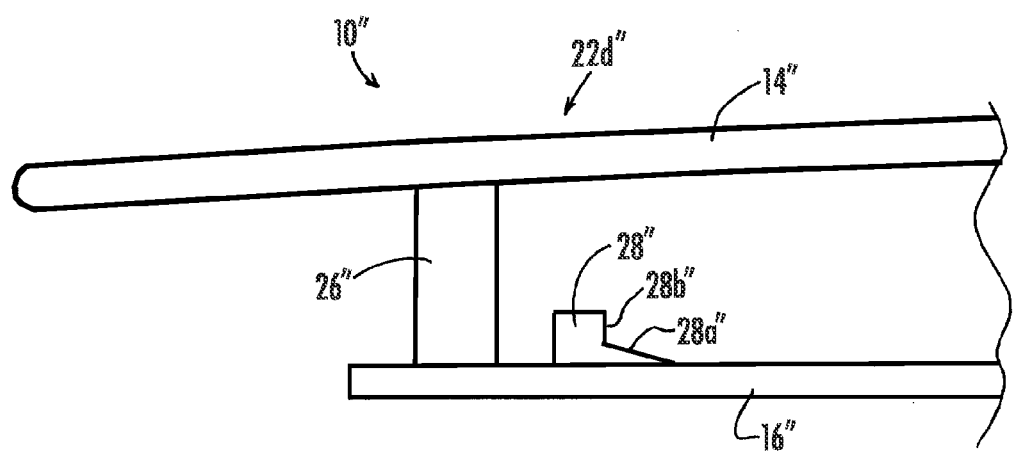
FIG. 14 is a sectional view of a portion of the window assembly of FIG. 13.
Figure 15:
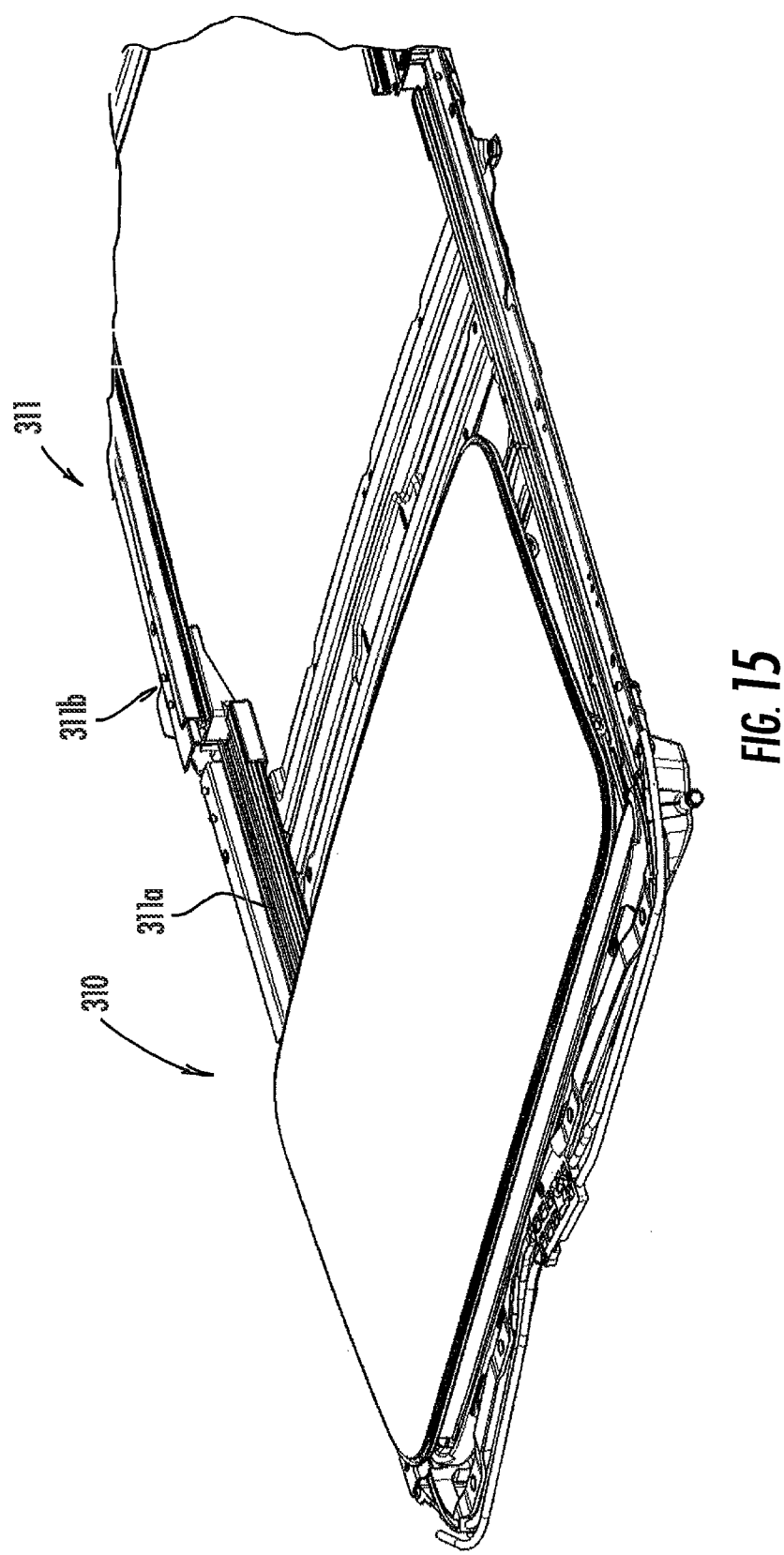
FIG. 15 is a perspective view of a movable sunroof window assembly in accordance with the present invention.
Figure 16:
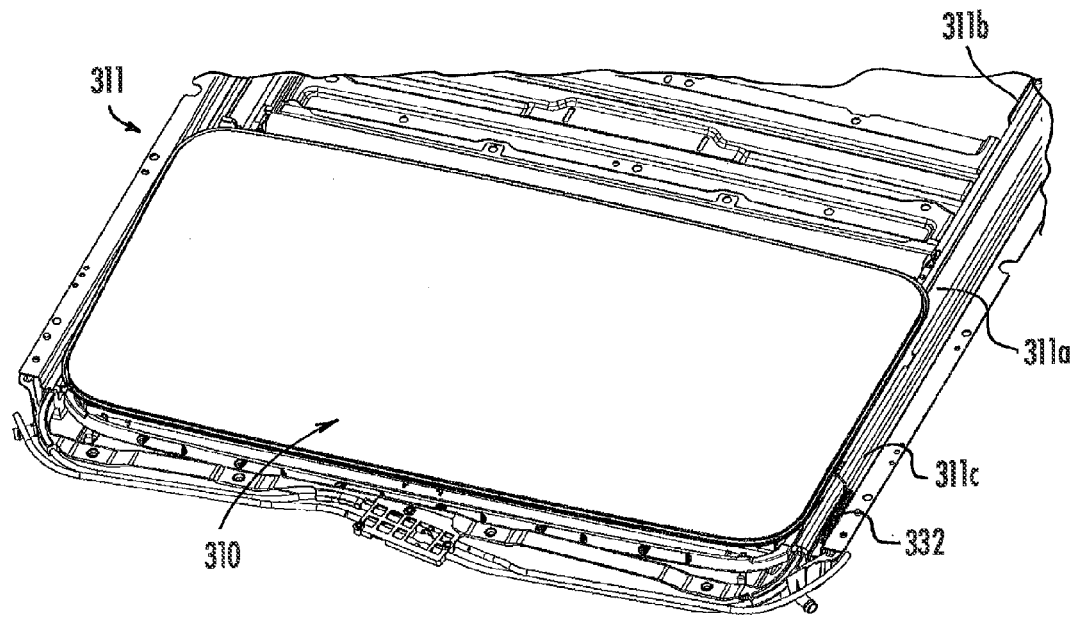
FIGS. 16-18 are other perspective views of the movable sunroof window assembly of FIG. 15.
Figure 17:
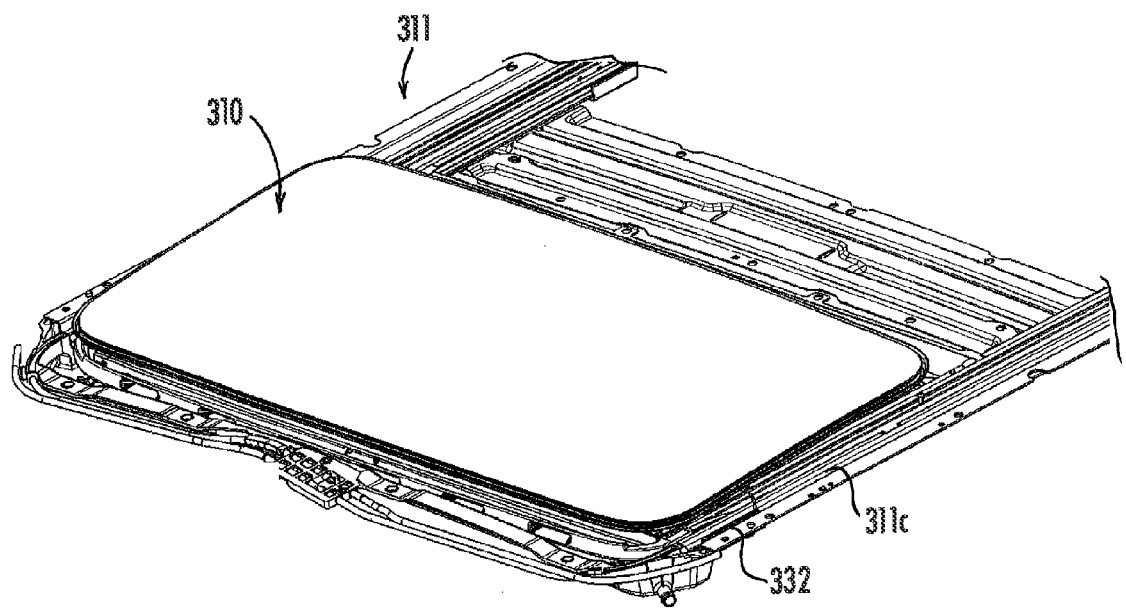
Figure 18:
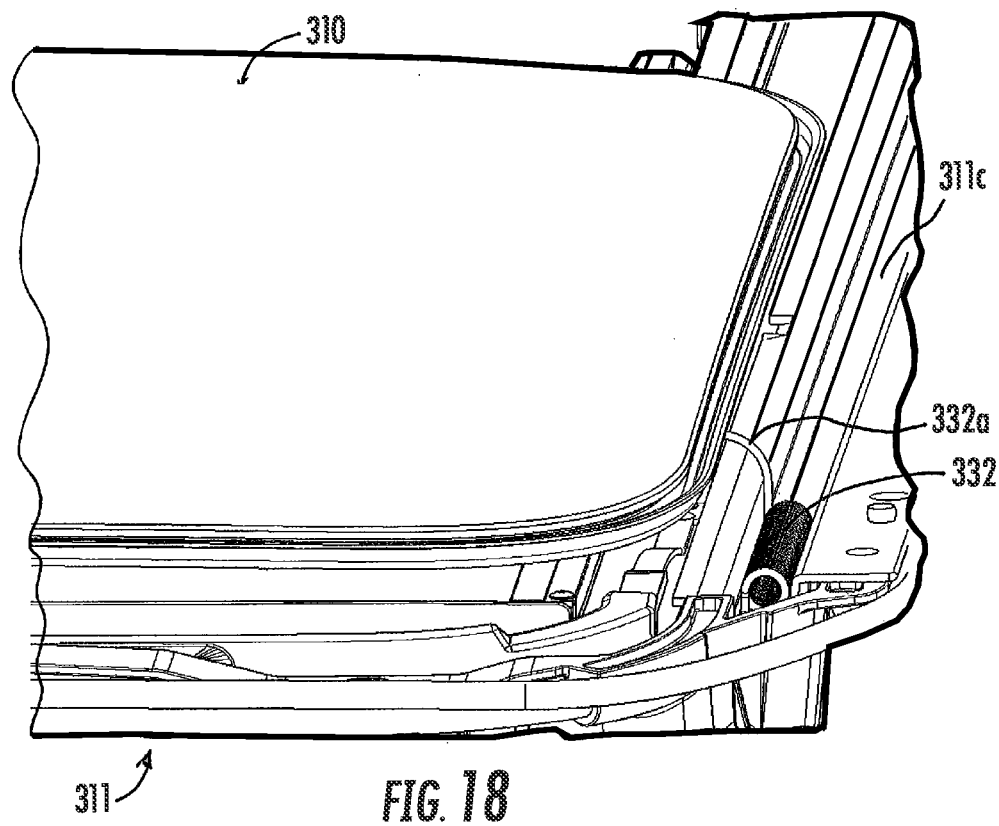
Figure 19:
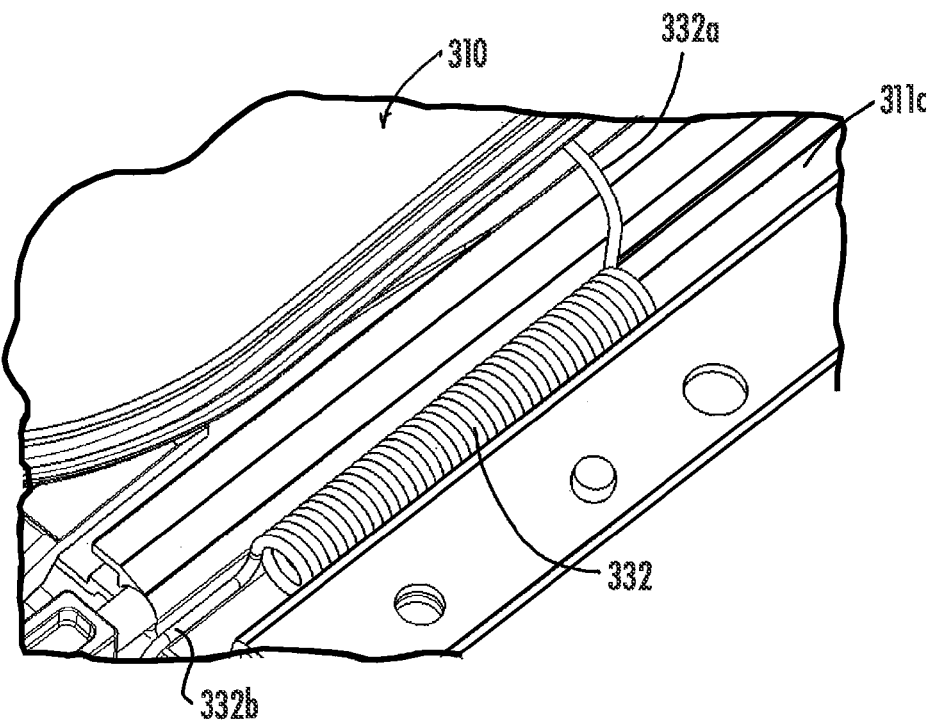
FIG. 19 is an enlarged perspective view of a portion of the movable sunroof window assembly of FIGS. 15-18.

Optionally, the window assembly may have a curved or non-linear end region (such as the end region opposite where the shading element is coiled and attached) and, to provide shading to such a curved profile, the end of the shading element that is uncoiled at the curved end region of the window assembly may be cut or formed to have a curvature or arc to generally correspond to a curved end stop or the like at and along the curved end region of the window panel. For example, and as shown in FIGS. 11 and 12, a window assembly 10' may include a curved end region 22d' with a curved end stop 28' disposed along the inner or lower window panel 16' and within the interpane cavity established via the perimeter spacer 26' (note that the outer or upper window panel 14' is not shown in FIG. 11). As shown in FIG. 12, the end stop 28' may comprise a generally square or rectangular shaped end stop (or any other suitable shape or configuration) with a generally vertical or flat surface 28a' for engaging the end of the uncoiled film. Optionally, and with reference to FIGS. 13 and 14, a window assembly 10" may include a curved end region 22d" with a curved end stop 28" disposed along the inner or lower window panel 16" and within the interpane cavity established via the perimeter spacer 26" (note that the outer or upper window panel 14" is not shown in FIG. 13). As shown in FIG. 14, the end stop 28" may comprise a generally square or rectangular shaped end stop (or any other suitable shape or configuration) with a ramped surface 28a" for engaging the end of the uncoiled film. The ramped surface provides a gradual slope that slopes upwards from the surface of the window panel for the end portion of the uncoiled film to contact or overlap, and the end stop may have a generally vertical surface 28b" at the upper end of the ramped surface 28a". Thus, the ramped surface 28a" allows for the end or edge of the uncoiled film to at least partially contact and/or overlap the ramped surface and the end stop 28" substantially entirely across or along the end stop 28". Moreover, if the film is misaligned or if formed with an uneven curvature at its end or edge, the end or edge, of the film may overlap or cover the ramped surface 28a" and/or the generally vertical surface 28b" of the end stop 28" at different degrees of overlap to still provide contact to the end stop across or along the entirety of the end stop (or substantially the entirety of the end stop) to provide discharge across the film when it is fully uncoiled to the end stop 28a".

Optionally, although described above as an electro-polymeric shade element, it is envisioned that the interpane cavity shading element may comprise any other suitable type of shade element that may be disposed in the cavity or sandwiched between the window panels and that may be coiled or otherwise retracted to a retracted position and uncoiled or extended to an extended or shading position within the interpane cavity. For example, the shade element may have a coiled sheet or film that may be disposed in the interpane cavity and uncoiled and coiled via a motor that imparts rotation to the coiled sheet or that imparts translational movement of the sheet along and within the interpane cavity of the window assembly (such as via moving a leading end of the sheet along the cavity and optionally with one or more guide elements or channels along the sides of the cavity that receive the side portions of the shading element therein to guide the shading element between its shading and non-shading positions). For example, the shade element may utilize aspects of any other suitable interpane sun shade or screen assembly, and may utilize aspects of the shades or screens described in U.S. patent application Ser. No. 11/243,783, filed Oct. 5, 2005 and published Apr. 20, 2006 as U.S. Publication No. US-2006-0082192, which is hereby incorporated herein by reference in its entirety. The window assembly or module thus provides an integrated window assembly and shade device, with the shading element disposed within the interpane cavity of the window assembly. The motor or drive system or control for the shade device may be incorporated as part of the window module, and electrical connections may be readily made to the drive motor or system via connection of a vehicle wiring harness to one or more connectors accessible at the window module. The drive system and/or any components required for imparting the desired movement or extension/retraction of the shade element may be disposed at and/or along one or more of the perimeter overhang regions and/or inboard or outboard of the perimeter sealing/spacing element, and may be hidden or concealed from view by the darkened frit layer at the outer window panel.

Optionally, other controllable or adjustable shade means may be implemented to achieve the desired or appropriate shading function or light/heat transmission switching to control the window assembly of the present invention. For example, the shading means may comprise a thermotropic switching means that has a thermotropic material at the glass window that changes its light or energy transmissivity in response to temperature changes. Optionally, the controllable shading means may comprise a gasotropic material which cause a change in optical properties in response to a chemical reaction between a layer coated on the glass and a gas fed into the cavity between the two glass panes. Optionally, the window assembly and controllable shading means may comprise an electro-optic shading means, such as a window assembly incorporating liquid crystal technology, electrochromic technology or suspended particle device (SPD) technology or the like.

For example, a liquid crystal window assembly of the present invention may comprise two glass sheets or substrates, such as described above, with liquid crystal molecules disposed therebetween. When an electrical field is applied to the glass substrate or substrates, the orientation of the liquid crystal molecules or chains is altered to adjust the optical transmission of the glass window assembly. For example, when no voltage is applied at the window, the molecules are randomly scattered and visual light passing through the window is diffused in multiple directions (providing a generally translucent effect), and, when a voltage is applied at the window, the molecules generally align with the applied electric field and light can pass through the window generally unobstructed.

Optionally, for example, an electrochromic window assembly of the present invention may comprise two glass sheets or substrates, such as described above, with an electrochromic medium (such as a solid polymer matrix or SPM medium or the like and/or such as utilizing aspects of the electrochromic devices described in U.S. Pat. Nos. 7,274,501; 6,493,128; 6,420,036; 6,039,390; 5,724,187; 5,668,663; 5,472,643; 5,239,405; 5,233,461; and/or 5,151,816, which are hereby incorporated herein by reference in their entireties) disposed therebetween. The inner surfaces of the two glass sheets are coated with an electrically conductive material (such as a transparent electrically conductive material, such as an indium tin oxide or the like) and, when a voltage is applied to the electrically conductive materials, the electrochromic medium darkens to reduce the transmissivity of light through the window.

Optionally, for example, a suspended particle device (SPD) window assembly of the present invention may comprise two glass sheets or substrates, such as described above, with a suspended particle film disposed between the glass sheets or substrates. The film contains rod-like particles that are suspended in liquid droplets distributed across the film. When no voltage is applied to the film, the particles are in random positions and generally block light transmission through the window (whereby the window may appear tinted). When a voltage (such as an AC voltage) is applied to the film, the particles generally align and allow for light transmission through the window. The degree of light transmission through the film and window may be adjusted by varying the voltage applied to the film. The film is disposed between two electrically conductive layers that function similar to a parallel-plate capacitor, and which provide a substantially uniform electric field across the film when energized. This results in a substantially uniform response throughout the SPD film when switching from clear (substantially light transmissive) to tinted (at least partially light blocking).

Optionally, such an SPD window may include solid radiation-absorbing particles in the liquid suspension to enhance the control or reduction of heat transmission through the window assembly. The optical properties of the window assembly may be adjusted or controlled based on the thickness of the suspension film and concentration of the particles in the film and based on the type of particles in the film. Optionally, the materials and density of particles of an SPD window may be selected to allow for a clear or substantially clear window even when a voltage is applied (while reducing transmission of some light therethrough and/or reducing transmission of UV light and/or heat).

A variety of chromogenic materials and technologies may be used, such as described in N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics Materials and Devices for Transmittance Control, C. M. Lampert and C. G. Granquist, EDS., Optical Engineering Press, Wash. (1990), which are hereby incorporated herein by reference in their entireties. Optionally, for example, suspended particle device (SPD) technology, such as available from Research Frontiers Inc. of Woodbury, N.Y., and such as disclosed in U.S. Pat. Nos. 7,847,033; 7,791,788; 7,417,785; 7,361,252; 6,987,602; 6,936,193; 6,900,923; 6,897,997; 6,804,040; and/or 6,606,185 (which are hereby incorporated herein by reference in their entireties), may be used in a window assembly in accordance with the present invention. Optionally, an SPD film, such as available from Hitachi Chemical Co., such as, for example, SPD film LCF-1103DHA, may be used in a window assembly in accordance with the present invention.

Optionally, the chromogenic panel or panels may be of the electrochromic (EC), photochromic, liquid crystal (LC), user-controlled-photochromic (UCPC), polymer-dispersed-liquid crystal (PDLC), or suspended particle type, such as described in U.S. Pat. Nos. 6,528,782; 6,493,128; and 6,039,390, which are hereby incorporated herein by reference in their entireties. The chromogenic panel should have a light-transmissive substrate, such as glass or plastic, which is preferably clear. The chromogenic panel may be made to change its optical properties, typically by applying electricity, heat or light. It will be appreciated that certain types of chromogenic devices, such as thermochromic and/or photochromic devices, may have optical properties which vary as a consequence of temperature and/or incident light, but such devices nevertheless could be adapted for use in this invention by providing a suitable control system. Those skilled in the art will appreciate that for EC, LC and PDLC devices, optical properties can be controlled by applying electric power to the two opposing terminals defined by the two transparent conductors. For photochromic and UCPC devices, optical properties can be controlled by subjecting the panels to light, such as solar radiation.

The chromogenic panel may comprise a panel having optical properties, such as color or opacity, which vary in response to an applied electrical signal, or are otherwise user-controllable. By controlling those optical properties the type and amount of light and/or other electromagnetic radiation passing through the chromogenic panels can be regulated so as to maintain a desired level. For example, preferred chromogenic panels could be derived from EC, UCPC, LC, and PDLC technologies. These devices can be designed so that when colored to any desired extent, they will not show a significant change in the state of coloration even after the power is no longer applied. This retention of optical properties can last for a significant period of time, such as, for example, greater than eight hours.

The chromogenic panel and/or outer panel can have at least one layer of material disposed thereon or therebetween which changes either an optical property or a physical property of the overall chromogenic assembly. Such optical properties include the panel's ability to transmit (especially to reduce) solar radiation, to transmit (especially to reduce) ultraviolet radiation, to transmit (especially to reduce) visible light, to reduce reflection (an antireflective), to modify the spectrum of the incoming light (tinting), or to polarize the incoming light. The physical properties include the panel's ability to reflect heat, its surface hardness, and its E-coating properties (such as a low-emissivity or low-E coating which serves to reduce the transmission of infrared radiation through the glass).

The chromogenic panel is protected by an outer panel or protective panel, which may be composed of light-transmissive material, such as glass or plastic or the like. The transmissive material is preferably clear, but could also be partially or entirely opaque. Furthermore, the protective outer panel may conform to the shape of the vehicle roof, or the structure in which the window panels are mounted. Of course, other shapes could be used if so desired.

Further, to provide added safety in applications of the present invention, the surface of the chromogenic panel or panels facing the user of the window (such as the lower surface of the inner panel of a sunroof that faces towards the cabin of the vehicle), and/or the surface of the chromogenic panel facing the protective outer panel can be contacted with a layer or multilayer of polymer such as a plastic material. Examples of such materials are recited in U.S. Pat. No. 5,239,406, which is hereby incorporated herein by reference in its entirety, and may include a polyester/polyvinylbutyral composite layer and a reticulated polyurethane.

The window assembly or module may be mounted to the vehicle via any suitable mounting or attachment means, and may utilize aspects of the window modules described in U.S. patent application Ser. No. 11/933,699, filed Nov. 1, 2007, and published May 8, 2008 as U.S. Patent Publication No. US-2008-0106124, which is hereby incorporated herein by reference in its entirety. For example, the upper or outer window panel may be bonded or adhered to one or more flanges of the sheet metal of the vehicle to attach the window assembly or module at the vehicle (with the darkened frit layer hiding the bonding area of the window assembly and sheet metal or flanges), such as in a similar manner as a typical or known or conventional single pane glass window panel may be conventionally attached at a vehicle roof. The inner or lower window panel may be supported at the outer window panel via the sealing or spacing element. Thus, for example, for a sunroof or moonroof application, the lower window panel may generally hang from the upper window panel and sealing/spacing element, and in in-cabin trim element or headliner may abut or frame the perimeter edges of the lower window panel to provide a generally flush or framed in appearance at the interior of the vehicle to a person viewing the window assembly from within the vehicle cabin when the window assembly is normally mounted at the vehicle.

Optionally, the window assembly or module may include a frame portion at or around the lower window panel and/or sealing/spacing element to provide a mounting surface or attachment surface or flanges for attaching one or more interior trim elements or headliners or roofliners to the window assembly or module when it is normally mounted at the vehicle. The frame portion of the roof modules or assemblies of the present invention may comprise any suitable material, and may comprise a polymeric or plastic frame portion, such as a PVC frame portion that provides an encapsulation of the upper and side perimeter portions of the glass roof panel. The frame portion may be formed utilizing aspects of the frame portions or encapsulated window modules of the types described in U.S. Pat. Nos. 6,669,267; 6,729,674; 6,572,176; 6,394,529; 6,299,235; 6,220,650, which are hereby incorporated herein by reference in their entireties.

The glass window panels may be bonded or secured to frame or header portions (such as by utilizing aspects of the window modules described in U.S. patent application Ser. No. 11/933,699, filed Nov. 1, 2007, and published May 8, 2008 as U.S. Patent Publication No. US-2008-0106124, which is hereby incorporated herein by reference in its entirety) and the frame and/or header portions may be bonded or secured to the vehicle sheet metal via any suitable bonding material or adhesive, such as a butyl seal and/or a urethane or the like, such as via curing of a bonding or an adhesive material and utilizing bonding processes of the types described in U.S. Pat. Nos. 6,298,606; 6,128,860; 5,966,874; 5,704,173; and 5,551,197, which are hereby incorporated herein by reference in their entireties. For example, the window panels may be bonded to a header or the vehicle sheet metal by an adhesive, such as a urethane adhesive, including a one part or two part urethane adhesive, an epoxy adhesive, an acrylic adhesive, a polyvinylbutyral adhesive, a silicone adhesive, or the like. Reference is made to U.S. Pat. Nos. 4,364,214; 4,364,595; 6,299,255; and 6,220,650, which are hereby incorporated herein by reference in their entireties, for examples of suitable adhesives. Optionally, and desirably, the outer glass window panel may include a frit layer at the perimeter regions that is substantially opaque (such as a dark color or black) and, therefore, provides a concealing function and may further facilitate the adhesion or bonding of the panel to the vehicle.

Optionally, the shadable window assembly, such as a sunroof or the like, may be openable and closable via moving the window panel between an opened position and a closed position. In such an application, electrical connection is made to the shading element to selectively power the shading element to shade or tint the window panel as desired. Optionally, the electrical connection may only be made when the window panel is closed, whereby the moving of the window panel to its closed position makes the electrical connection (such as between electrical contacts or terminals at a portion of the window panel and at the frame or supporting structure at the vehicle). Optionally, the electrical connection may be maintained throughout the range of movement of the window panel, so that electrical powering or control of the shading element may be provided irrespective of the position or degree of opening/closing of the window panel. Such continuous electrical connection may be made via any suitable means, such as via a flexible wire or cable or a pigtail wire or cable (such as a coiled wire similar to what is known to be used in telephone cords and the like) or sliding electrical contacts or the like (and such electrical connections may utilize aspects of the window assemblies described in U.S. patent application Ser. No. 12/850,864, filed Aug. 5, 2010, and/or U.S. provisional application Ser. No. 61/434,555, filed Jan. 20, 2011, which are hereby incorporated herein by reference in their entireties). For example, a flexible or foldable or coiled or spooled wire or cable may have an end attached to electrical terminals at the vehicle (such as to electrically connect to a vehicle wiring harness) and another end attached to electrical terminals at the window panel (such as to electrically connect to the shading element or device). The wire or cable may extend or unfold or uncoil as the window panel is moved towards its opened or closed position and may retract or fold or coil as the window panel is moved towards its closed or opened position.

For example, and with reference to FIGS. 15-19, a movable window assembly 310 may be movable along a window frame 311. In the illustrated embodiment, the movable window assembly and frame comprise a sunroof assembly for a vehicle, and the window frame 311 may be mounted to a roof of a vehicle, with the movable window assembly 310 being tiltable and/or slidable relative to the frame 311 to provide the desired opening of the sunroof. Optionally, the frame 311 may include tracks and frame members 311a along which the movable window assembly is moved between its opened and closed positions, and may include fixed window frame portions 311b for mounting a rear or fixed window panel thereto (for vehicles with a front openable sunroof window and a rear fixed sunroof window). The window assembly 310 includes an electrically operable shading element (such as described above), with an electrical lead or terminal at a perimeter region thereof for electrically connecting to an electrical wire or lead or connector of a vehicle wiring harness or the like. As shown in FIGS. 16-19, window assembly 310 includes an electrically conductive element or wire or lead 332 (connected to and extending from a forward region of a side of the window assembly, such as at the driver's side of the window assembly) that is electrically connected to a power source (such as to a vehicle wiring harness at the roof of the vehicle and/or such as to a user input or inputs that provide user control of the shading element and/or such as to a control or the like that may provide automatic shading of the window assembly responsive to a photo sensor or the like).

In the illustrated embodiment, electrical wire 332 comprises a helical or coiled wire or cable that is disposed along a channel 311c of the window frame 311, with an end portion 332a extending out of the channel 311c to connect to the window assembly 310 (such as to a connector or terminal at the front and side perimeter region of the window assembly), and with an opposite end portion 332b extending out of the end of the channel 311c to connect to the vehicle wiring harness or power source or the like. Optionally, the window assembly may include an electrical connector (such as a rigid connector or terminals) that extends from the perimeter edge region of the window assembly and to which a corresponding connector at the end 332a of the electrical wire or cable 332 may be readily connected during assembly of the sunroof assembly. Optionally, the end 332b of the wire or cable 332 may include an electrical connector that can be readily connected to a corresponding connector of a vehicle wiring harness or the like when the sunroof assembly is mounted at the vehicle roof.

Thus, when the window assembly is in its closed state, the wire or cable 332 is unstretched or compressed or retracted partially along the channel 311c of frame 311, and when the window assembly is moved or slid along the tracks of the frame 311 towards its opened state (such as manually or via a powered window drive system or the like), the end portion 332a of the wire or cable 332 moves with the window and the stretchable or elastic wire or cable 332 stretches or elongates along the channel 311c. When the window assembly moves back towards its closed position or state, the wire or cable 332 retracts due to its elasticity and biasing towards its retracted state and due to the movement of the end 332a of the wire or cable 332 towards the end 332b of the wire or cable 332 as the window is moved towards its closed position. Also, by providing the electrical connection at or near the forward end or edge of the window assembly, the tilting of the window to a partially opened orientation does not substantially raise or lift or move the end 332a of the wire or cable 332 so that the coiled wire or cable 332 remains within the channel 311c of the frame 311. Optionally, the frame or wire or cable may include a guide element or retaining element that may extend along and/or in or through the coiled wire or cable 332 to retain the wire or cable 332 in the channel as the wire or cable stretches and retracts during opening and closing of the window assembly. For example, the guide element may comprise an elongated rod or the like affixed at at least one end to the frame so that the guide element extends along the channel of the frame, and the helical or coiled wire may be coiled around the guide element, whereby the wire may stretch and retract along the guide element and channel as the window is moved between its closed and opened positions.

Thus, the coiled wire or cable 332 provides electrical powering and control of the shading element of the window assembly throughout the range of movement of the window assembly. Optionally, other types of electrical wires or cables or connectors may be implemented to provide continuous electrical connection or powering to the shading element of the window assembly, such as by utilizing aspects of the heated slider window assemblies described in U.S. patent application Ser. No. 12/850,864, filed Aug. 5, 2010, and/or U.S. provisional application Ser. No. 61/434,555, filed Jan. 20, 2011, which are hereby incorporated herein by reference in their entireties). Optionally the electrical connections may be made to the shading element at any location around the periphery of the window assembly, without affecting the scope of the present invention.

Therefore, the present invention provides a shading device or element that is disposed in a window module that has an overhanging outer window panel to fit at and at least partially within an opening in the outer sheet metal of a vehicle to provide a uniform or flush fit and finish and appearance at the exterior of the vehicle. The outer window panel may have a frit coating or other suitable darkened coating or hiding layer or the like disposed around its perimeter regions to conceal the bonding regions of the outer window panel to the vehicle (such as to flanges or sheet metal or the like of the vehicle) and to conceal the perimeter seal or spacer and, for window assemblies comprising a flexible or coilable/uncoilable shading element, the coiled shading element or film (when in its coiled or retracted position), to enhance the appearance of the window assembly and vehicle to a person viewing the window assembly from outside the vehicle when the window assembly is normally mounted or installed at the vehicle. The inner and outer window panels may have different contours or curvatures and/or dimensions to correspond to the contours or curvatures of the in-cabin surface of the vehicle (such as the vehicle headliner or roof liner of the vehicle) and the outer surface of exterior panels of the vehicle (such as the exterior sheet metal of the vehicle), respectively. In order to provide such different curvatures, the sealing elements or spacers may have non-uniform profiles to engage and seal against the opposing surfaces of the window panels and to provide a varying interspacing distance or gap between the window panels.

Changes and modifications to the specifically described embodiments may be carried out without departing from the principles of the present invention, which is intended to be limited only by the scope of the appended claims, as interpreted according to the principles of patent law.

The invention claimed is:

1. A window assembly for a vehicle, said window assembly comprising:
   an outer window panel;
   an inner window panel;
   a spacer element disposed between said inner and outer window panels to establish an interpane cavity between said inner and outer window panels;
   wherein at least one of (a) said outer window panel has larger cross dimensions relative to said inner window panel to provide overhang regions of said outer window panel, and (b) said inner window panel has a different contour or curvature than that of said outer window panel so that said interpane cavity varies in gap distance across said window assembly;
   a roller shade disposed in said interpane cavity, wherein said roller shade is electrically deployable to coil and uncoil between a coiled light transmitting condition, where said roller shade functions to substantially allow light transmission through said window assembly, and an at least partially uncoiled light attenuating condition, where said roller shade functions to at least partially attenuate light transmission through said window assembly;
   wherein, when in said coiled light transmitting condition, said roller shade is in a coiled or retracted position, where said roller shade is coiled along a perimeter region of said window assembly, and, when in said at least partially uncoiled light attenuating condition, said roller shade is in an uncoiled or extended position, where said roller shade is uncoiled to at least partially cover a surface of said inner window panel;

wherein said roller shade comprises a conductive film that uncoils in response to a voltage applied thereto, said film limiting or reducing light transmission through said window panels and said window assembly when said film is at least partially uncoiled;

a stop element disposed at said inner window panel, wherein an end of said film at least partially contacts said stop element when said film is uncoiled to its light limiting state; and wherein said stop element comprises a ramped portion and wherein said end of said film at least partially overlaps said ramped portion of said stop element when said film is uncoiled to its light limiting state.

2. The window assembly of claim 1, wherein said outer window panel has larger cross dimensions relative to said inner window panel to provide overhang regions of said outer window panel.

3. The window assembly of claim 2, wherein said outer window panel has a darkened perimeter layer or coating about its periphery so as to at least partially conceal the presence of said spacer element from view by a person viewing said window assembly from external the vehicle when said window assembly is normally mounted at the vehicle.

4. The window assembly of claim 3, wherein said darkened perimeter layer at least partially conceals the presence of a portion of the vehicle that is disposed around said inner window panel to support said window assembly at the vehicle when said window assembly is normally mounted at the vehicle.

5. The window assembly of claim 2, wherein said outer window panel has an outer surface that is generally flush with an outer surface of at least one of (a) an outer panel of the vehicle and (b) a windshield of the vehicle and (c) a rear backlite of the vehicle.

6. The window assembly of claim 1, wherein said inner window panel has a different contour or curvature than that of said outer window panel so that said interpane cavity varies in gap distance across said window assembly.

7. The window assembly of claim 6, wherein an outer surface of said outer window panel corresponds with a contour of an outer surface of at least one of (a) an exterior panel of the vehicle and (b) a windshield of the vehicle and (c) a rear backlite of the vehicle, and wherein an in-cabin surface of said inner window panel corresponds with a contour of an in-cabin surface of an interior panel or headliner or trim element of the vehicle.

8. The window assembly of claim 1, wherein both (a) said outer window panel has larger cross dimensions relative to said inner window panel to provide overhang regions of said outer window panel, and (b) said inner window panel has a different contour or curvature than that of said outer window panel so that said interpane cavity varies in gap distance across said window assembly.

9. The window assembly of claim 8, wherein said window assembly comprises a roof window assembly for a roof of the vehicle.

10. The window assembly of claim 9, wherein said outer window panel comprises an upper window panel and said inner window panel comprises a lower window panel.

11. The window assembly of claim 10, wherein said upper window panel is curved to generally correspond to a curvature of a roof portion of the vehicle and wherein said lower window panel is curved to generally correspond to an interior ceiling trim portion of the vehicle.

12. The window assembly of claim 1, wherein said film is coiled and uncoiled responsive to a drive system of said window assembly.

13. The window assembly of claim 12, wherein said drive system is responsive to a user input of the vehicle to selectively coil and uncoil said film.

14. The window assembly of claim 1, wherein said stop element comprises an electrically conductive element and wherein said stop element discharges said film when said end of said film at least partially contacts said ramped portion of said stop element when said film is uncoiled to its light limiting state.

15. The window assembly of claim 1, wherein said stop element comprises an arcuate stop element that is longitudinally curved across a perimeter region of said inner window panel, and wherein said end of said film comprises an arcuate edge that generally corresponds to the curvature of said arcuate stop element.

16. The window assembly of claim 1, wherein said roller shade is electrically operable to adjust between said coiled light transmitting condition and said at least partially uncoiled light attenuating condition, and wherein electrical connection is made between said roller shade and a vehicle power source to provide electrical power to said roller shade.

17. The window assembly of claim 16, wherein said window assembly comprises a movable window assembly that is movable relative to the vehicle at which it is mounted between opened and closed positions.

18. The window assembly of claim 17, wherein said electrical connection is made to said roller shade irrespective of a position of said movable window assembly relative to the vehicle.

19. The window assembly of claim 18, wherein said electrical connection is made via an electrically conductive element that comprises at least one of (a) a flexible wire, (b) a coiled wire, (c) a spooled wire, (d) a stretchable wire, (e) a foldable wire and (f) an electrical contact that slidably engages another electrical contact when said movable window assembly is moved.

20. The window assembly of claim 19, wherein said window assembly comprises a movable sunroof assembly configured for mounting at a roof of the vehicle.

21. A window assembly for a vehicle, said window assembly comprising:

an outer window panel;

an inner window panel;

a spacer element disposed between said inner and outer window panels to establish an interpane cavity between said inner and outer window panels;

wherein said outer window panel has larger cross dimensions relative to said inner window panel to provide overhang regions of said outer window panel;

wherein said inner window panel has a different curvature than that of said outer window panel so that said interpane cavity varies in gap distance across said window assembly;

wherein said outer window panel has a darkened perimeter layer or coating about its periphery so as to at least partially conceal the presence of said spacer element from view by a person viewing said window assembly from external the vehicle when said window assembly is normally mounted at the vehicle;

a roller shade disposed in said interpane cavity, wherein said roller shade is electrically deployable to coil and uncoil between a coiled light transmitting condition, where said roller shade functions to substantially allow light transmission through said window assembly, and an at least partially uncoiled light attenuating condition, where said roller shade functions to at least partially attenuate light transmission through said window assembly;

wherein said roller shade comprises a conductive film that uncoils in response to a voltage applied thereto, said film limiting or reducing light transmission through said window panels and said window assembly when said film is at least partially uncoiled;

a stop element disposed at said inner window panel, wherein an end of said film at least partially contacts said stop element when said film is uncoiled to its light limiting state; and wherein said stop element comprises a ramped portion and wherein said end of said film at least partially overlaps said ramped portion of said stop element when said film is uncoiled to its light limiting state.

22. The window assembly of claim 21, wherein said stop element comprises an electrically conductive element and wherein said stop element discharges said film when said end of said film at least partially contacts said ramped portion of said stop element when said film is uncoiled to its light limiting state.

23. The window assembly of claim 21, wherein said roller shade is electrically operable to adjust between said coiled light transmitting condition and said at least partially uncoiled light attenuating condition, and wherein electrical connection is made between said roller shade and a vehicle power source to provide electrical power to said roller shade.

24. The window assembly of claim 23, wherein said window assembly comprises a movable window assembly that is movable relative to the vehicle at which it is mounted between opened and closed positions, and wherein said electrical connection is made to said roller shade irrespective of a position of said movable window assembly relative to the vehicle.

25. A window assembly for a vehicle, wherein said window assembly comprises a roof window assembly for a roof of the vehicle, said window assembly comprising:

an upper window panel;
a lower window panel;
a spacer element disposed between said upper and lower window panels to establish an interpane cavity between said upper and lower window panels;

wherein said lower window panel has a different curvature than that of said upper window panel so that said interpane cavity varies in gap distance across said window assembly, and wherein said lower window panel is curved less than said upper window panel;

wherein said upper window panel is curved to generally correspond to a curvature of a roof portion of the vehicle and wherein said lower window panel is curved to generally correspond to an interior ceiling trim portion of the vehicle;

a roller shade disposed in said interpane cavity, wherein said roller shade is electrically deployable to coil and uncoil between a coiled light transmitting condition, where said roller shade functions to substantially allow light transmission through said window assembly, and an at least partially uncoiled light attenuating condition, where said roller shade functions to at least partially attenuate light transmission through said window assembly;

wherein said roller shade comprises a conductive film that uncoils in response to a voltage applied thereto, said film limiting or reducing light transmission through said window panels and said window assembly when said film is at least partially uncoiled;

a stop element disposed at said lower window panel, wherein an end of said film at least partially contacts said stop element when said film is uncoiled to its light limiting state; and wherein said stop element comprises a ramped portion and wherein said end of said film at least partially overlaps said ramped portion of said stop element when said film is uncoiled to its light limiting state.

26. The window assembly of claim 25, wherein said upper window panel has larger cross dimensions relative to said lower window panel to provide overhang regions of said upper window panel.

27. The window assembly of claim 25, wherein said upper window panel has a darkened perimeter layer or coating about its periphery so as to at least partially conceal the presence of said spacer element from view by a person viewing said window assembly from external the vehicle when said window assembly is normally mounted at the vehicle.

28. The window assembly of claim 25, wherein said stop element comprises an electrically conductive element and wherein said stop element discharges said film when said end of said film at least partially contacts said ramped portion of said stop element when said film is uncoiled to its light limiting state.

29. The window assembly of claim 25, wherein said roller shade is electrically operable to adjust between said coiled light transmitting condition and said at least partially uncoiled light attenuating condition, and wherein electrical connection is made between said roller shade and a vehicle power source to provide electrical power to said roller shade.

30. The window assembly of claim 29, wherein said window assembly comprises a movable window assembly that is movable relative to the vehicle at which it is mounted between opened and closed positions, and wherein said electrical connection is made to said roller shade irrespective of a position of said movable window assembly relative to the vehicle.

* * * * *